(12) United States Patent
Matsuoka

(10) Patent No.: US 7,346,453 B2
(45) Date of Patent: Mar. 18, 2008

(54) ALARM DEVICE FOR VEHICLE

(75) Inventor: Katsuji Matsuoka, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 166 days.

(21) Appl. No.: 10/956,083

(22) Filed: Oct. 4, 2004

(65) Prior Publication Data

US 2005/0248445 A1    Nov. 10, 2005

(30) Foreign Application Priority Data

May 6, 2004    (JP) ............... 2004-137144

(51) Int. Cl.
*G08G 1/16*    (2006.01)
(52) U.S. Cl. .............. 701/301; 701/300; 340/903; 340/435; 342/70
(58) Field of Classification Search .............. None
See application file for complete search history.

(56) References Cited

U.S. PATENT DOCUMENTS

| | | | |
|---|---|---|---|
| 6,119,067 A * | 9/2000 | Kikuchi | 701/300 |
| 6,434,486 B1 * | 8/2002 | Studt et al. | 701/301 |
| 6,590,495 B1 * | 7/2003 | Behbehani | 340/435 |
| 6,853,311 B2 * | 2/2005 | Taniguchi | 340/903 |
| 6,865,138 B1 * | 3/2005 | Li | 367/99 |
| 2004/0090314 A1 * | 5/2004 | Iwamoto | 340/425.5 |

FOREIGN PATENT DOCUMENTS

| | | |
|---|---|---|
| JP | 54-118036 A | 9/1979 |
| JP | 08-293099 A | 11/1996 |
| JP | 2000-233699 A | 8/2000 |
| JP | 2002-274303 A | 9/2002 |

* cited by examiner

*Primary Examiner*—Thomas Black
*Assistant Examiner*—Marie A Weiskopf
(74) *Attorney, Agent, or Firm*—Sughrue Mion, PLLC

(57) ABSTRACT

An alarm device according to the present invention includes a distance measuring sensor for detecting an object in a slanting rear direction of a vehicle and a distance to the object from the vehicle, a direction indicator switch, an alarming object determination part for determining whether the object detected by the distance measuring sensor is an alarming object, and an alarm generation part for generating an alarm to the driver based on the determination result at the alarming object determination part, and so on. The alarming object determination part determines whether the object is an alarming object based on a change with time in the distance between the object detected by the distance measuring sensor and the vehicle, and detection duration of the object by the distance measuring sensor.

9 Claims, 22 Drawing Sheets

F I G . 9
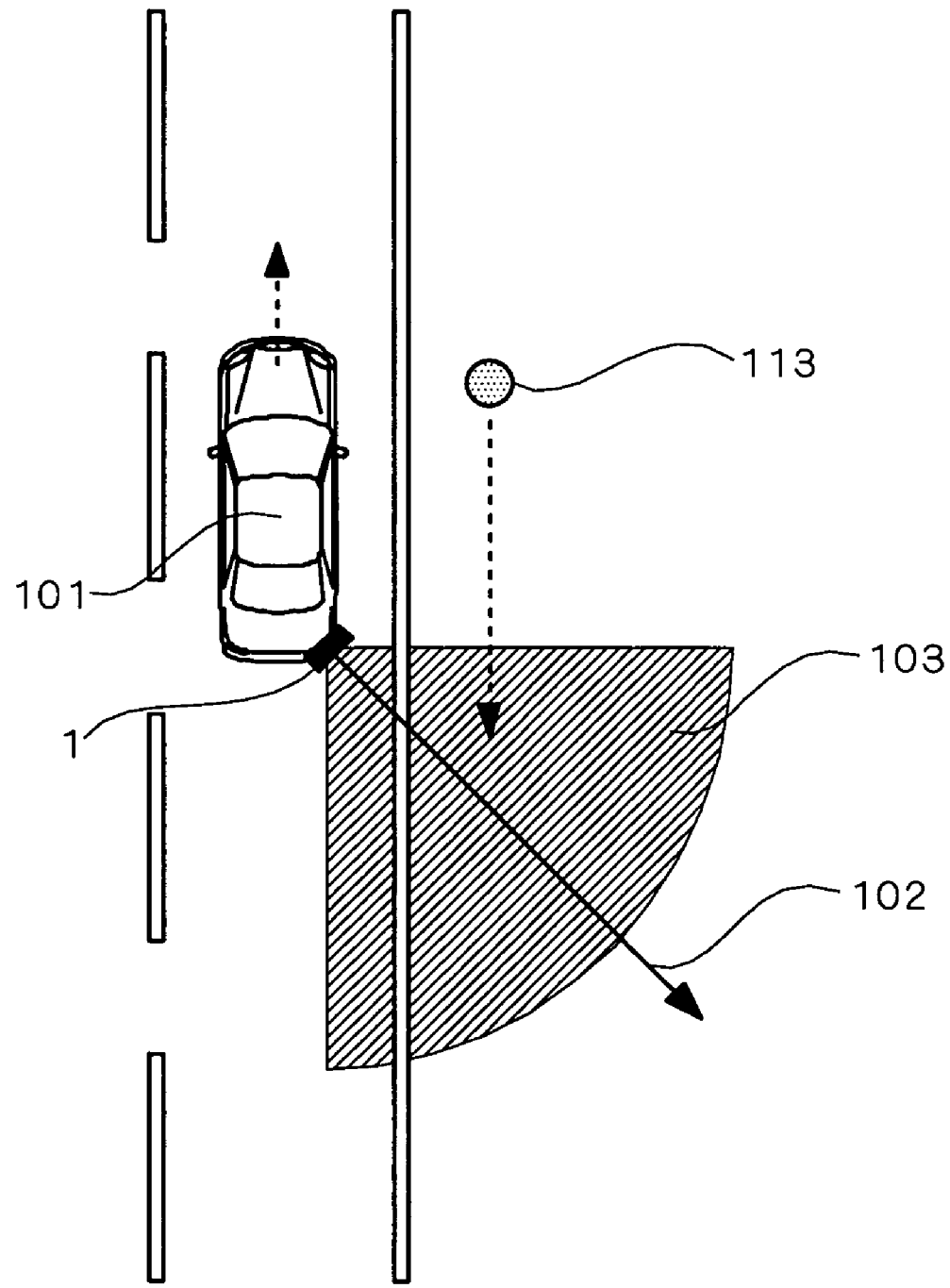

FIG. 10
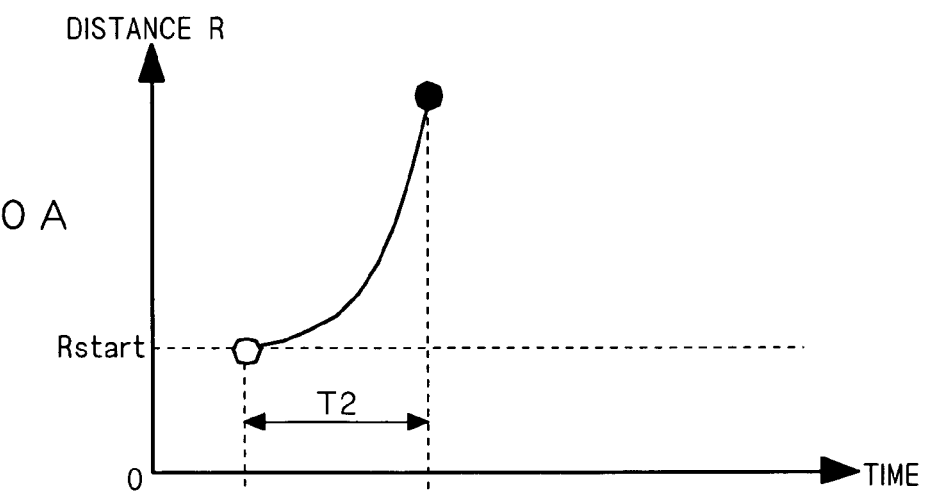
FIG. 10A
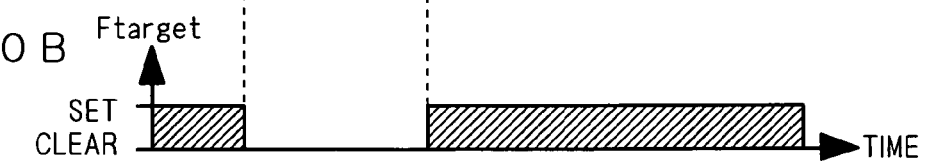
FIG. 10B

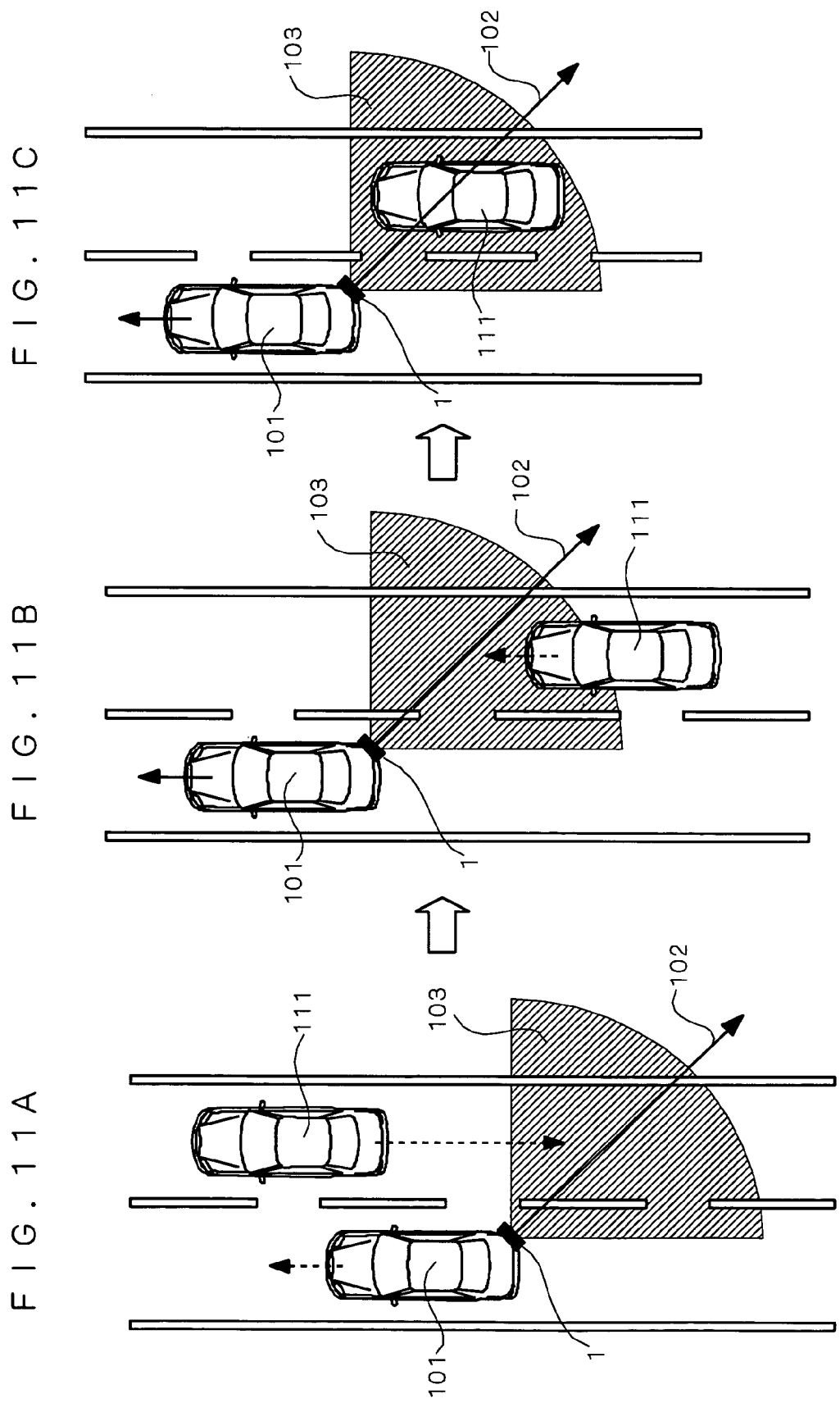

F I G . 2 4
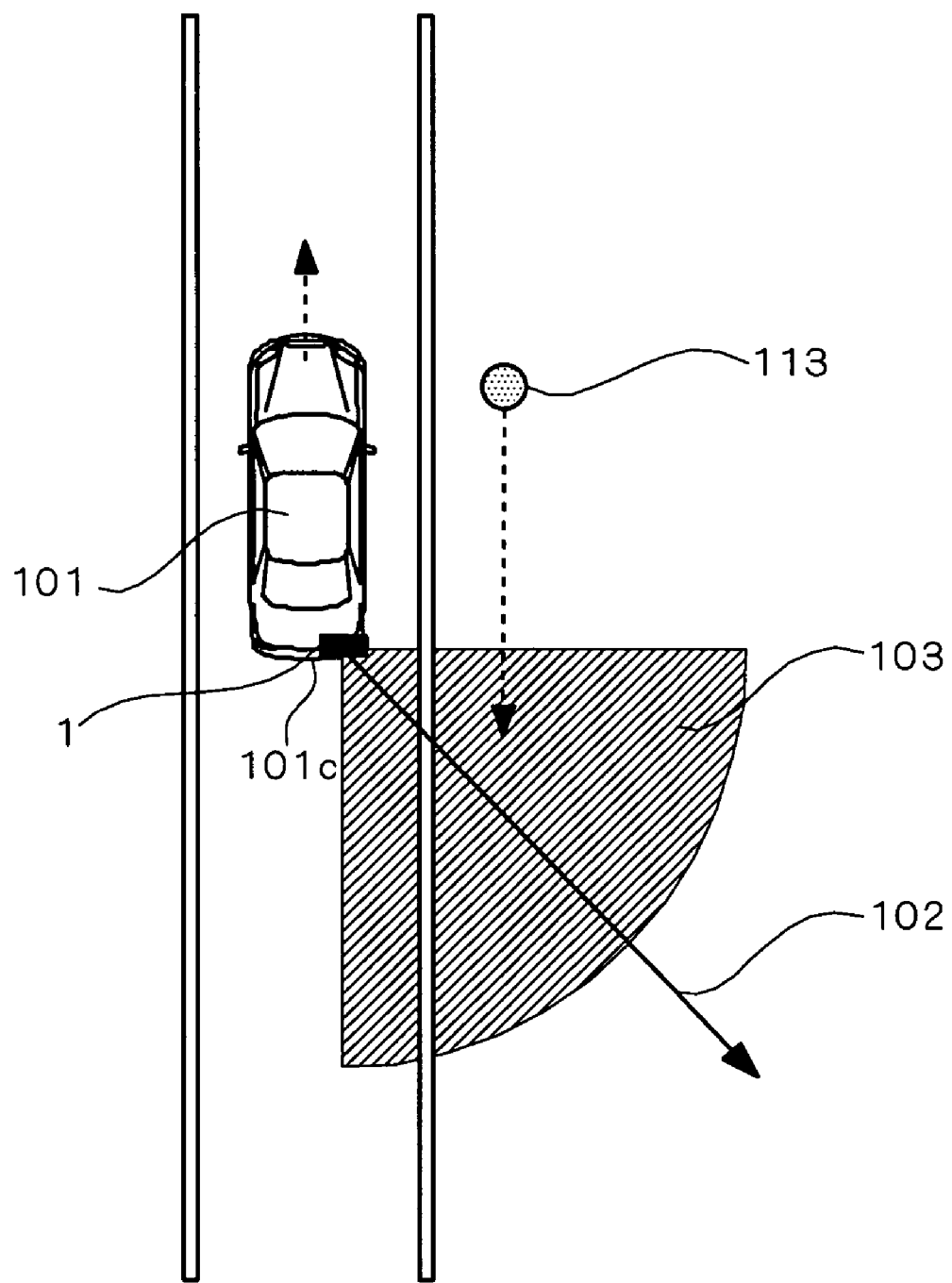

ALARM DEVICE FOR VEHICLE

BACKGROUND OF THE INVENTION

1. Field of the Invention

The present invention relates to an alarm device for a vehicle for detecting an object that approaches the vehicle and generating an alarm.

2. Description of the Background Art

For accident avoidance during vehicle travel, an alarm device is conventionally known that includes a distance measuring sensor mounted on a vehicle to detect obstacles around the vehicle and alert the driver to approach of the obstacles. A conventional alarm device known includes a reckless overtaking alarm device as disclosed in Japanese Patent Application Laid-Open No. 54-118036 (1979), which monitors a slanting rear direction of a direction to which a driver intends to make a lane change, to detect the following vehicle in that direction. This alarm device detects an instruction operation for lane change, determines whether the following vehicle is within a prescribed region when the instruction operation is present, and generates an alarm to inform that overtaking is dangerous based on the determination result.

Japanese Patent Application Laid-Open No. 2000-233699 proposes another alarm device that recognizes a vehicle traveling state based on a steering angle, yaw rate, navigation information, etc., and detects objects in a direction appropriate to the traveling state, thus generating an alarm when obstacles are detected around the vehicle.

Japanese Patent Application Laid-Open Nos. 2002-274303 and 8-293099 (1996) also disclose techniques for an alarm device for a vehicle.

The above alarm devices disclosed in JP 54-118036 (1979) and JP 2000-233699 generate an alarm for all objects that are present in a fixed distance range from the vehicle. Accordingly, an alarm is generated not only for objects for which an alarm needs to be generated, such as a rearwardly approaching vehicle or a vehicle remaining in a blind spot region of the driver, but for objects for which an alarm does not need to be generated, such as a forwardly approaching stationary object including roadside street lamps and poles (hereinafter referred to as a "forwardly approaching stationary object") or a forwardly approaching vehicle on the opposite lane, which annoys the driver.

SUMMARY OF THE INVENTION

It is an object of the present invention to provide an alarm device for a vehicle capable of generating an alarm reliably to a rearwardly approaching vehicle and a vehicle remaining in a blind spot region of the driver while preventing alarm generation to a forwardly approaching stationary object and a vehicle on the opposite lane.

An alarm device for a vehicle according the present invention includes a distance measuring sensor, a lane changing detection part, an alarming object determination part, and an alarm generation part. The distance measuring sensor detects a distance between an object in a slanting rear direction of a vehicle and the vehicle. The lane changing detection part detects the vehicle's driver's indication of his or her intention to make a lane change. The alarming object determination part determines whether an object detected by the distance measuring sensor is an alarming object. The alarm generation part generates an alarm to the driver based on the distance detected by the distance measuring sensor, a determination result by the alarming object determination part, and a detection result by the lane changing detection part. The alarming object determination part determines whether a certain object is an alarming object based on a change with time in the distance to the certain object that has been detected continuously by the distance measuring sensor, and detection duration of the certain object by the distance measuring sensor.

The determination whether an object detected by the distance measuring sensor is an alarming object is made based on a change with time in the distance between the object and the vehicle (host vehicle). When an object approaching the host vehicle from behind is detected using a distance measuring sensor for detecting an object in a slanting rear direction of the host vehicle, the distance between the object and the host vehicle usually decreases with time. On the other hand, when a stationary object approaching the host vehicle from the front including roadside street lamps and poles or a vehicle on the opposite lane is detected, the distance between the object and the host vehicle increases with time. Therefore, the determination whether an object detected by the distance measuring sensor is an alarming object based on a change with time in the distance between the object and the host vehicle, as made in the present invention, ensures that a vehicle approaching from behind is regarded as an alarming object, thus generating an alarm reliably to the vehicle.

Also, since a stationary object approaching from the front including roadside street lamps and poles or a vehicle on the opposite lane pass the host vehicle faster than when the host vehicle overtakes a vehicle in an adjacent lane traveling in the same direction as the host vehicle, the detection duration of the roadside stationary object or the vehicle on the opposite lane is shorter than that of the vehicle in an adjacent lane traveling in the same direction as the host vehicle. Therefore, the determination whether an object is an alarming object based on detection duration of the object, as made in the present invention, ensures that a vehicle in an adjacent lane remaining in a blind spot region is regarded as an alarming object while omitting a roadside stationary object or a vehicle on the opposite lane from alarming object targets. As a result, an alarm can be issued reliably to a vehicle remaining in a blind spot region while alarm generation is prevented for a roadside stationary object or a vehicle on the opposite lane.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 5, 6A, 6B, 7, 8A, 8B, 9, 10A, 10B, 11A to 11C and 12 explain the operation of the alarm device for a vehicle according to the first preferred embodiment;

FIGS. 23 and 24 show positions where the alarm device for a vehicle of the present invention is mounted.

DESCRIPTION OF THE PREFERRED EMBODIMENTS

First Preferred Embodiment

Figure 1:
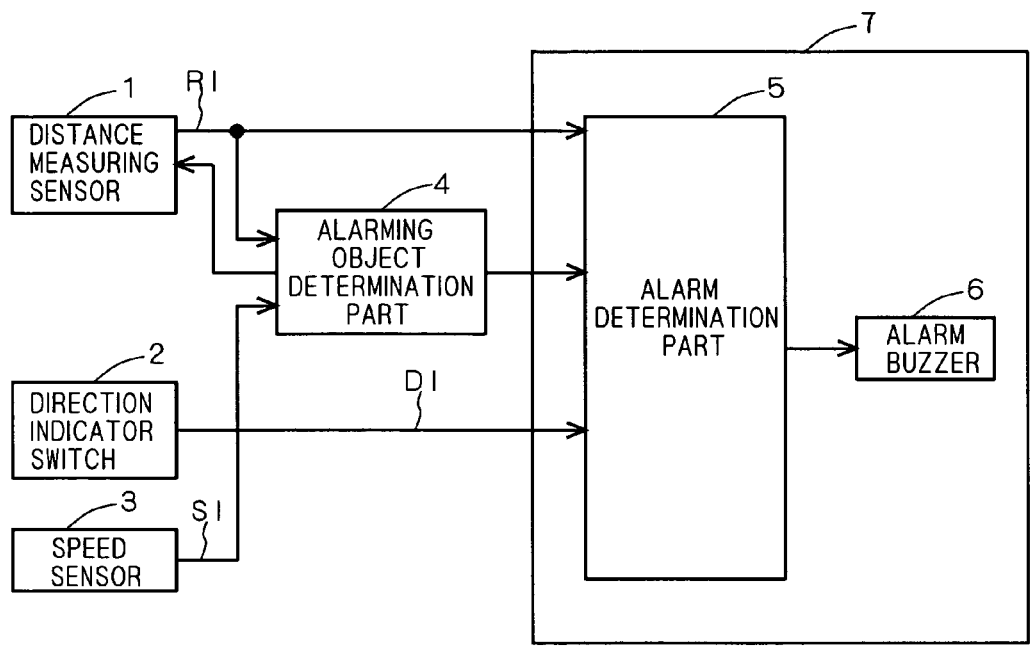
FIG. 1 is a block diagram showing the configuration of an alarm device for a vehicle according to a first preferred embodiment of the present invention.

FIG. 1 is a block diagram showing the configuration of an alarm device for a vehicle (hereinafter referred to simply as an "alarm device") according to a first preferred embodiment of the present invention. This alarm device is mounted on a vehicle, detects an object approaching the vehicle, determines whether the detected object is an alarming object, and generates an alarm to the vehicle's driver based on the determination result.

As shown in FIG. 1, the alarm device according to the first preferred embodiment includes a distance measuring sensor 1, a direction indicator switch 2, a speed sensor 3, an alarming object determination part 4, and an alarm generation part 7. The sensor 1 is mounted, for example, at a corner portion at the right rear of the vehicle, and detects an object in a rightward-slanting rear direction of the vehicle. The sensor 1 then detects a distance R between the detected object and the vehicle, and outputs the detection result as distance information RI. The sensor 1 uses an electromagnetic wave, for example, and detects the distance R between the object and the vehicle by measuring time between outputting an electromagnetic wave and receiving its reflection after the electromagnetic wave has hit the object.

The switch 2 functions as a lane changing detection part for detecting the driver's indication of his or her intention to make a lane change. In making a lane change to the right or left lane, the driver performs an operation in accordance with the lane change on the switch 2. That is, the driver indicates his or her intention to make a lane change to the right or left lane by operating the switch 2. The switch 2 detects the operation by the driver, and outputs the detection result to the alarm generation part 7 as detection information DI, which includes information that the driver indicated his or her intention to make a lane change to the right lane, or to the left lane, or information that the driver indicated no intention at all to make a lane change. The operation of the switch 2 causes a direction indicator on the right or left side (neither is shown) to flash in accordance with the operational information.

While the switch 2 is provided in the first preferred embodiment as means for detecting the driver's indication of his or her intention to make a lane change, a voice recognition device that recognizes the driver's voice may alternatively be provided, to detect the driver's indication of his or her intention to make a lane change. For example, the driver may indicate his or her intention to make a lane change by uttering a word such as "lane change to the right", so that the voice recognition device detects the indication and outputs the detection result to the alarm generation part 7 as the detection information DI.

The speed sensor 3 detects a speed VS of the vehicle on which the alarm device according to the first preferred embodiment is mounted, and outputs the detection result as speed information SI. The alarming object determination part 4 determines whether the object detected by the sensor 1 is an alarming object based on the distance R detected by the sensor 1 and the speed VS detected by the speed sensor 3 while controlling the distance measuring operation of the sensor 1.

The alarm generation part 7 includes an alarm determination part 5 and an alarm buzzer 6. The alarm determination part 5 determines whether to generate an alarm based on the distance information RI from the sensor 1, the detection information DI from the switch 2, and the determination result by the alarming object determination part 4, and drives the buzzer 6 based on the determination result. Consequently, the buzzer 6 is sounded to generate an alarm to the driver when the object detected by the sensor 1 is an alarming object, and the buzzer 6 is not sounded to generate no alarm to the driver when the object is not an alarming object.

Figure 2:
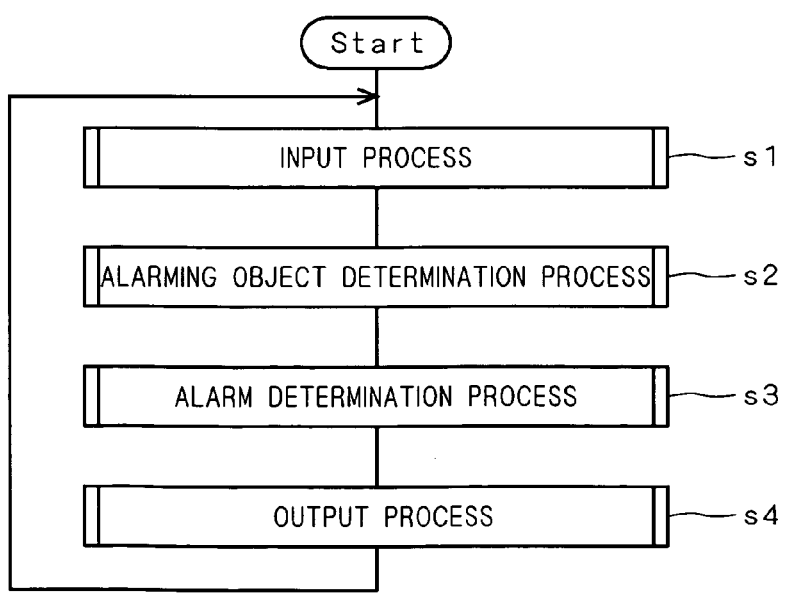
FIGS. 2 to 4 are flowcharts illustrating the operation of the alarm device for a vehicle according to the first preferred embodiment.

Now, a series of operations of the alarm device according to the first preferred embodiment will be explained between detecting an object approaching the vehicle and generating an alarm. FIG. 2 is a flowchart illustrating the operation of the alarm device. As shown in FIG. 2, an input process is performed at step s1. In this process, the alarming object determination part 4 gives the sensor 1 instructions to start the distance measuring operation, whereby the sensor 1 starts the operation. Upon receiving the instructions from the alarming object determination part 4, the sensor 1 transmits an electromagnetic wave and observes its reflected wave. Then, upon receiving the reflected wave, the sensor 1 calculates the distance R based on the time between transmitting the electromagnetic wave and receiving its reflected wave, and outputs the distance information RI. Consequently, the distance information RI is input to the alarming object determination part 4 and the alarm determination part 5. Also in the input process at step s1, the detection information DI from the switch 2 is input to the alarm determination part 5, and the speed information SI from the speed sensor 3 is input to the alarming object determination part 4.

Next, an alarming object determination process is performed at step s2. In this process, the alarming object determination part 4 determines whether the object detected by the sensor 1 is an alarming object based on the distance information RI and the speed information SI, and reflects the determination result on a flag Ftarget. Specifically, the alarming object determination part 4 sets a prescribed register provided in the part 4 itself to set the flag Ftarget after determining that the object detected by the sensor 1 is an alarming object, or clears the register to clear the flag Ftarget after determining that the object is not an alarming object.

Next, an alarm determination process is performed at step s3. In this process, the alarm determination part 5 determines whether to generate an alarm to the driver based on the distance information RI, the detection information DI, and the state of the flag Ftarget indicative of the determination result at the alarming object determination part 4, and reflects the determination result on a flag Fwarn. Specifically, the alarm determination part 5 sets a prescribed register provided in the part 5 itself to set the flag Fwarn after determining to generate an alarm to the driver, or clears the register to clear the flag Fwarn after determining not to generate an alarm.

Next, an output process is performed at step s4. In this process, the alarm determination part 5 drives the buzzer 6 based on the state of the flag Fwarn. The alarm determination part 5 drives and sounds the buzzer 6 to generate an alarm to the driver with the flag Fwarn being set, or does not drive the buzzer 6 to generate no alarm to the driver with the flag Fwarn being cleared.

The alarm device according to the first preferred embodiment performs a distance measuring cycle including the above steps s1 to s4 at prescribed time intervals, at intervals of several tens of ms, for example. Consequently, the sensor 1 can perform the detection operation multiple times on the same object present in its detection range, thus continuously detecting the distance R between the object and the vehicle. That is, the repeated performance of the distance measuring cycle allows the distance R to be detected multiple times during the time between a certain object's entering and departing from the detection range.

When the sensor 1 does not detect an object and output the distance information RI in the input process at step s1, that distance measuring cycle is completed without steps s2 to s4, followed by step s1 in the next cycle.

Figure 3:
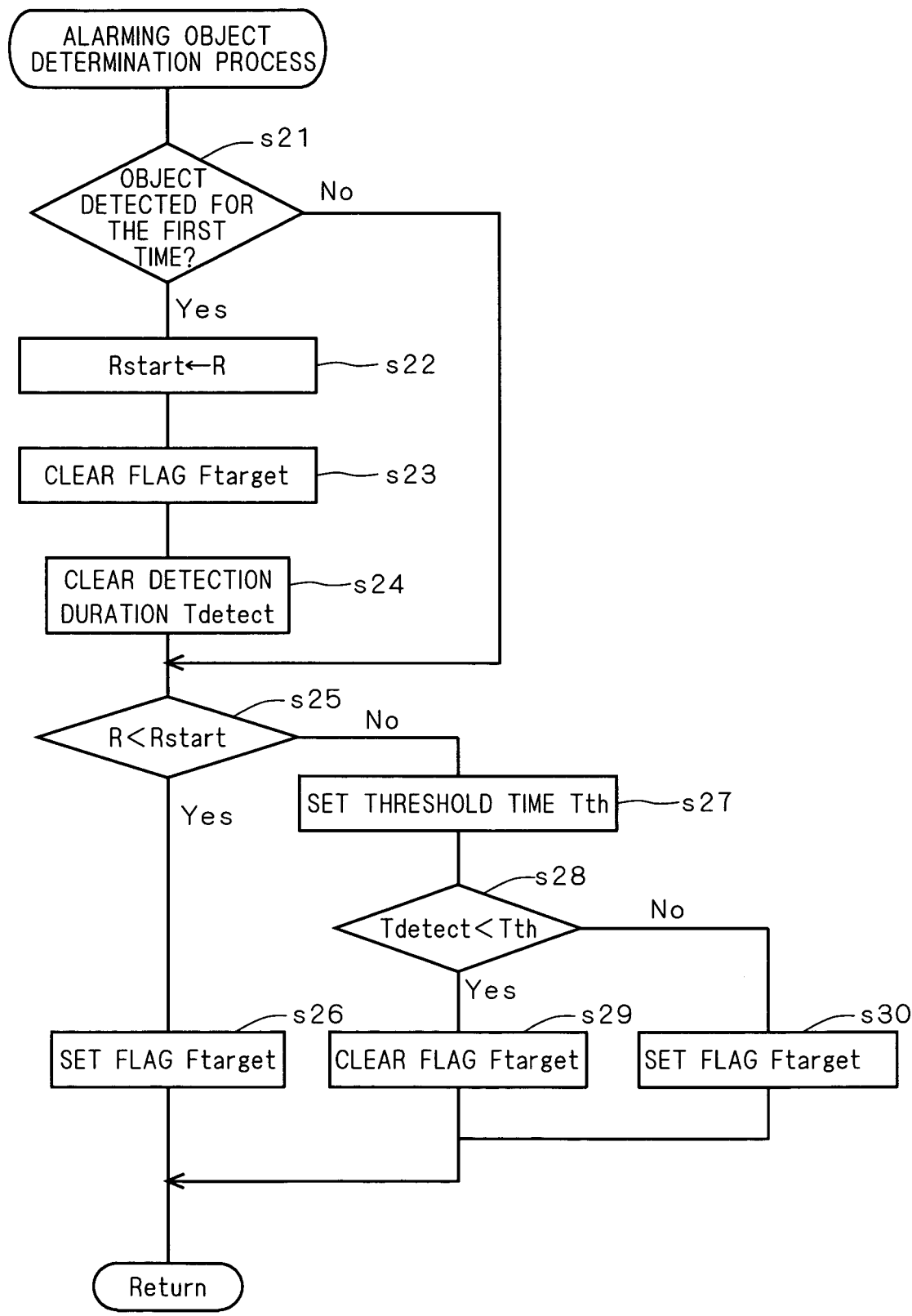
Figure 4:
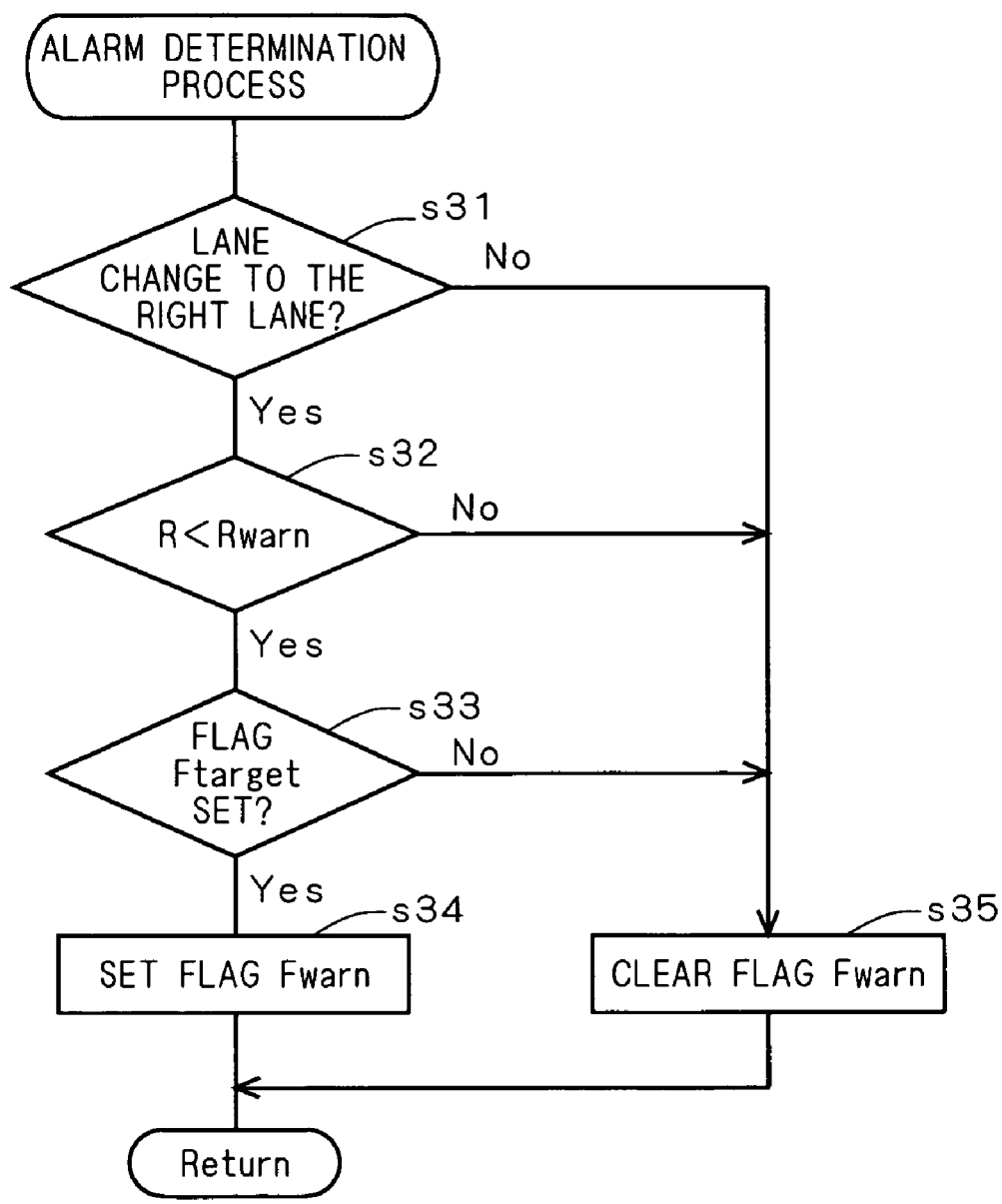

Now, the alarming object determination process at step s2 and the alarm determination process at step s3 will be explained in detail. FIGS. 3 and 4 are flowcharts illustrating the alarming object determination process and the alarm determination process, respectively. As shown in FIG. 3, at step s21, the alarming object determination part 4 determines whether the object detected at step s1 has been detected for the first time by the sensor 1.

The alarming object determination part 4 stores a history of information about whether having received the distance information RI from the sensor 1 in each distance measuring cycle. Upon receiving the distance information RI from the sensor 1 at step s1, the alarming object determination part 4 refers to the history to check to see whether having received the distance information RI in the previous cycle, and when it had not received, determines that an object detected in this cycle has been detected for the first time by the sensor 1, or when it had received, determines that the object detected in this cycle has been detected continuously by the sensor 1.

After it has been determined at step s21 that the detected object has been detected for the first time by the sensor 1, the alarming object determination part 4 stores the distance R indicated by the received distance information RI as an alarming object determination distance Rstart at step s22. Consequently, the distance R to the object detected at step s1 at the moment of starting detection by the sensor 1 is stored as Rstart. Then, the alarming object determination part 4 clears the flag Ftarget at step s23.

Next at step s24, the alarming object determination part 4 clears detection duration Tdetect that indicates the time during which the same object has been detected continuously by the sensor 1. Accordingly, when the object detected at step s1 has been detected for the first time by the sensor 1, the detection duration Tdetect is cleared to have its value set to zero at step s24. The alarming object determination part 4, which includes a not shown counter for counting the detection duration Tdetect, clears the value of this counter to thereby clear Tdetect.

After the detection duration Tdetect has been cleared at step s24, or when it is determined at step s21 that the object detected at step s1 has been detected continuously by the sensor 1, the alarming object determination part 4 compares the distance R indicated by the distance information RI received at step s1 and the alarming object determination distance Rstart at step s25. Then, when the comparison result shows the distance R is less than Rstart, the alarming object determination part 4 determines that the object detected at step s1 is an alarming object, and sets the flag Ftarget at step s26.

On the other hand, when the comparison result at step s25 shows the distance R is not less than Rstart, the alarming object determination part 4 sets a threshold time Tth based on the speed VS indicated by the speed information SI at step s27. Then, at step s28, the alarming object determination part 4 reads the value of the counter for counting the detection duration Tdetect to compare the current detection duration Tdetect and the threshold time Tth. The way the threshold time Tth is set will be described later in detail.

When it is determined at step s21 that the object detected at step s1 has been detected for the first time by the sensor 1, the distance R and the alarming object determination distance Rstart that are to be compared at step s25 are equal to each other. In this case, the step s25 is followed by step s27.

When the comparison result at step s28 shows the detection duration Tdetect is less than the threshold time Tth, the alarming object determination part 4 determines that the object detected at step s1 is not an alarming object, and clears the flag Ftagret at step s29. On the other hand, when the comparison result at step s28 shows Tdetect is not less than Tth, the alarming object determination part 4 determines that the object is an alarming object, and sets the flag Ftarget at step s30.

Alternatively, step s29 may be performed when the detection duration Tdetect is not more than the threshold time Tth, or step s30 may be performed when Tdetect is more than Tth. In such ways, either of step s29 and s30 may be performed when the values of Tdetect and Tth are equal to each other.

Following any of steps s26, s29 and s30, the alarm determination process is performed. In this process, step s31 is first performed as shown in FIG. 4. At step s31, the alarm determination part 5 refers to the detection information DI from the switch 2 to check to see whether the driver indicated his or her intention to make a lane change to the right lane. When the indication is confirmed at step s31, the alarm determination part 5 determines whether the distance R input at step s1 is less than a previously stored alarm determination distance Rwarn at step s32. That is, the alarm determination part 5 determines whether the detected object is approaching within the prescribed distance from the vehicle.

After it has been determined at step s32 that the distance R is less than the alarm determination distance Rwarn, the alarm determination part 5 determines that the detected object is present in a region with high collision potential with the vehicle, and performs step s33. At step s33, the alarm determination part 5 checks to see whether the flag Ftarget has been set, to see whether the detected object is an alarming object. With the flag Ftarget being set, the alarm determination part 5 determines to generate an alarm to the driver and sets the flag Fwarn at step s34.

On the other hand, when the driver's indication is not confirmed at step s31, or when the distance R is not less than the alarm determination distance Rwarn at step s32, or when the flag Ftarget is cleared at step s33, the alarm determination part 5 determines not to generate an alarm to the driver and clears the flag Fwarn.

Following either step s34 or step s35, the output process at the above step s4 is performed, where the buzzer 6 is driven in accordance with the state of the flag Fwarn. Subsequently, step s1 is performed to start the next distance measuring cycle that repeats the similar processes. Consequently, when the distance R to a certain object that has been detected continuously becomes less than the distance R at the moment of starting detection of the object, it is determined that the object is an alarming object. When the distance R is not less than the distance R at the moment of starting detection of the object, then when the detection duration Tdetect is less than the threshold time Tth, it is determined that the object is not an alarming object, and when Tdetect becomes more than Tth, it is determined that the object is an alarming object. And after it has been determined that the object detected by the sensor 1 is an alarming object, when the object is approaching the vehicle to the extent that it is likely to collide with the vehicle with the driver indicating his or her intention to make a lane change to the right lane, an alarm is generated to the driver.

Alternatively, it may be determined at step s32 whether the distance R is not more than the alarm determination distance Rwarn. In this case, step s33 will be performed when the distance R is not more than Rwarn at step s32, while step s35 will be performed when the distance R is more than Rwarn.

As discussed above, the alarm device according to the first preferred embodiment determines whether an object detected by the sensor 1 is an alarming object based on a change with time in the distance R between the object and the vehicle, and the detection duration Tdetect of the object. Consequently, the alarm device can omit a forwardly approaching stationary object and a vehicle on the opposite lane from alarming object targets while regarding a vehicle approaching from behind (hereinafter referred to as a "rearwardly approaching vehicle") as well as a vehicle remaining in a blind spot of the driver as an alarming object. This will be explained in detail with reference to FIGS. 5 to 12.

Figure 5:
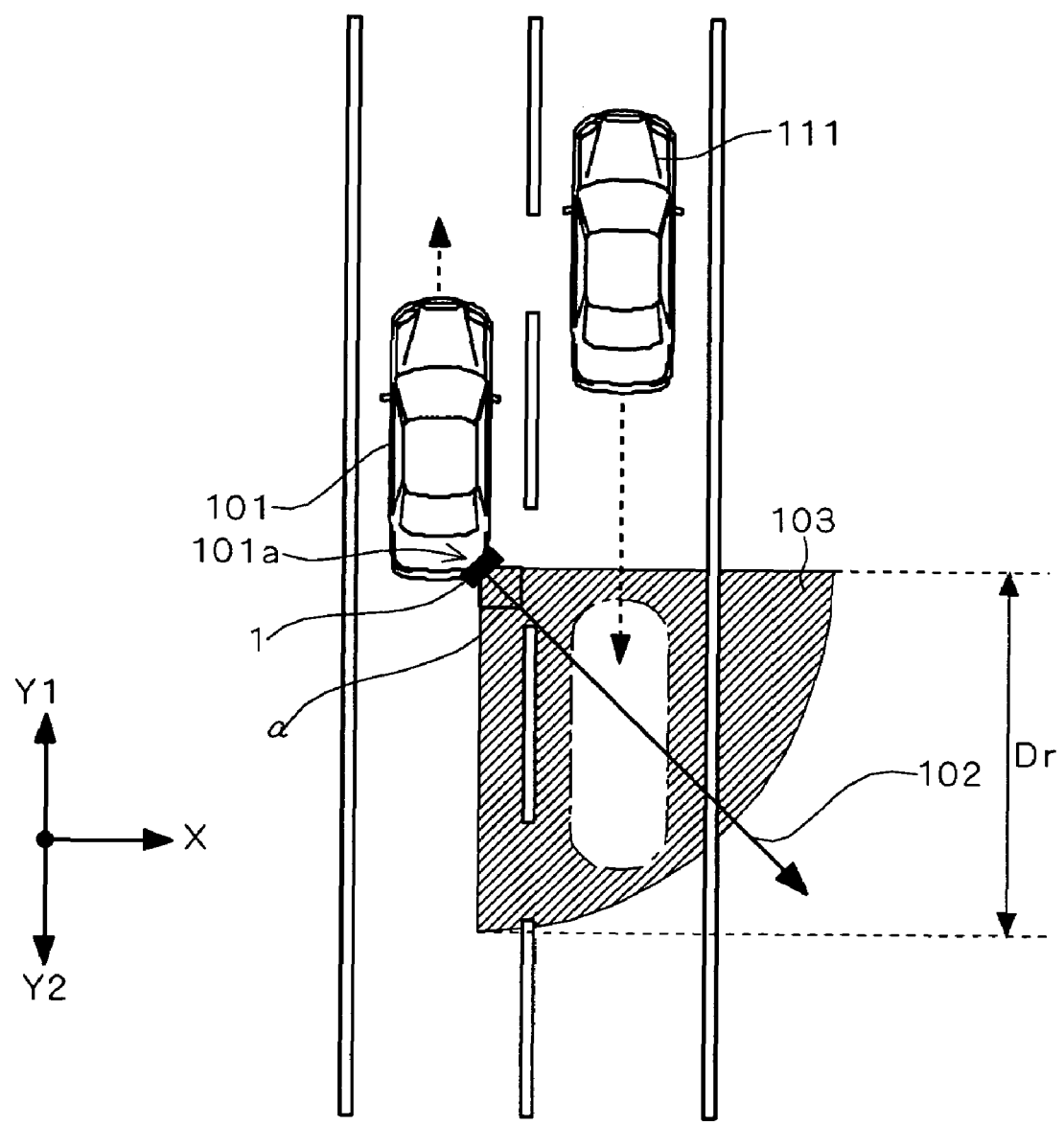
Figure 6:
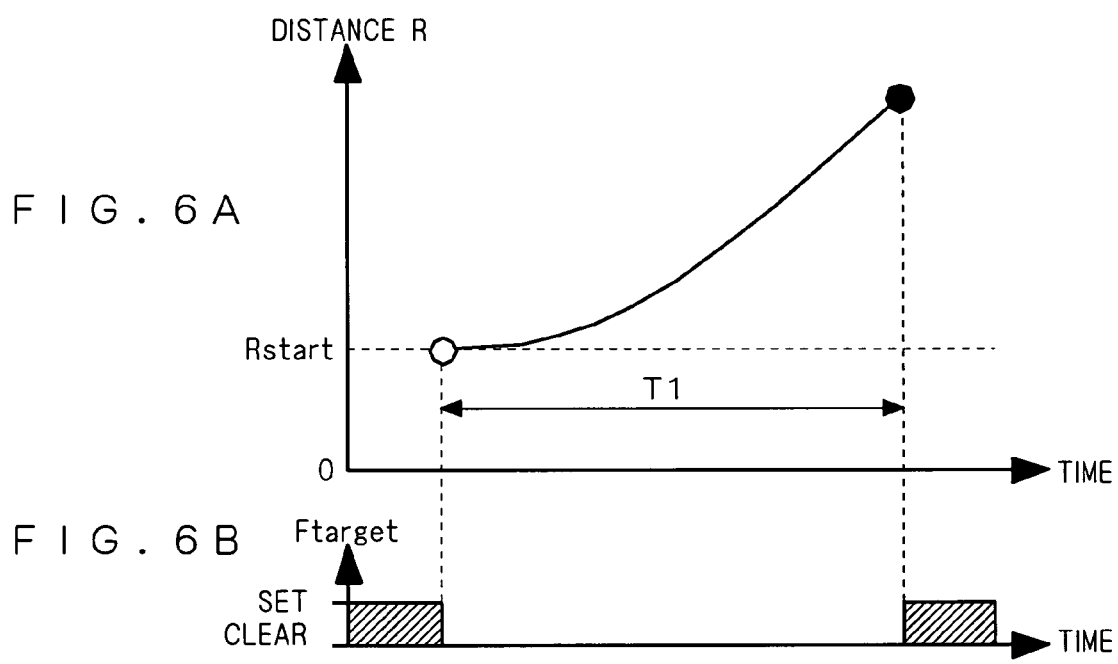

FIG. 5 shows a state where a vehicle 101 on which the alarm device according to the first preferred embodiment is mounted (hereinafter referred to as a "host vehicle"), and a vehicle 111 traveling in the same direction as the host vehicle 101 in an adjacent lane and relatively approaching the host vehicle 101 from the front (hereinafter referred to as a "forwardly approaching vehicle") pass each other. FIGS. 6A and 6B show a change with time in the distance R and the flag Ftarget in this case, respectively.

A Y1-axis direction and a Y2-axis direction shown in FIG. 5 indicate the traveling direction and its opposite direction of the host vehicle 101, respectively, and an X-axis direction indicates a direction obtained by rotating the traveling direction of the host vehicle 101 by 90 degrees clockwise in top view. A value indicated by a white circle in FIG. 6A indicates the distance R when the vehicle 111 has been detected for the first time by the sensor 1, i.e. the alarming object determination distance Rstart, and a value indicated by a black circle indicates the distance R in the distance measuring cycle immediately before the vehicle 111 departs from a detection range 103 of the sensor 1, i.e. the distance R in the cycle immediately before the sensor 1 loses track of the vehicle 111.

Further, FIG. 6B shows a state of the flag Ftarget where, when the distance R is not less than the alarming object determination distance Rstart at step s25 in the above alarming object determination process, step s29 is performed without steps s27 and s28. That is, in FIG. 6B, the flag Ftarget is always cleared when the distance R is not less than Rstart at step s25. The oblique lines in FIG. 6B indicate indeterminateness of the state of the flag Ftarget. These conditions also apply to each flag Ftarget shown in FIGS. 10B, 16B, 20B and 21B.

As shown in FIG. 5, the sensor 1 according to the first preferred embodiment is mounted at a right rearward corner portion 101a of the host vehicle 101. A maximum radiation direction (direction with a maximum antenna gain) 102 of receiving and transmitting antennas (neither is shown) of the sensor 1 is set toward a rightward-slanting rear direction of the host vehicle 101 at an angle of 45 degrees. That is, the angle formed by a direction extending from the corner portion 101a of the host vehicle 101 in the Y2-axis direction or a direction extending from the corner portion 101a in the X-axis direction, and the maximum radiation direction 102 is 45 degrees. Also, the sensor 1 has a viewing angle a set to 90 degrees. Accordingly, the detection range 103 of the sensor 1 has the shape of a sector with the corner portion 101a of the host vehicle 101 as its center and a central angle of 90 degrees, extending from the rear to the right side of the corner portion 101a, as shown in FIG. 5. Stated another way, the detection range 103 of the sensor 1 has the shape of a sector, extending from the direction extending from the corner portion 101a of the host vehicle 101 in the Y2-axis direction to the direction extending from the corner portion 101a in the X-axis direction. With the detection range 103 being set in this fashion, the sensor 1 can detect an object in a rightward-slanting rear direction of the host vehicle 101.

The detection range 103 of the sensor 1 is a portion where radiation patterns of the receiving and transmitting antennas of the sensor 1 overlap one another. Besides, the detection range 103 having the shape of a sector has a radius set to 5 meters.

When the forwardly approaching vehicle 111 passing the host vehicle 101 is detected continuously using the sensor 1 having the aforementioned the detection range 103, the distance R increases with time, as shown in FIG. 6A. The reason for this is when the host vehicle 101 and the vehicle 111 traveling in an adjacent lane on its right side pass each other, the sensor 1 starts detecting the vehicle 111 when it most approaches the sensor 1, and the vehicle 111 moves away from the sensor 1 with time. Time T1 in FIG. 6A indicates the time between the start of detection of and loss of track of the vehicle 111 by the sensor 1.

Figure 7:
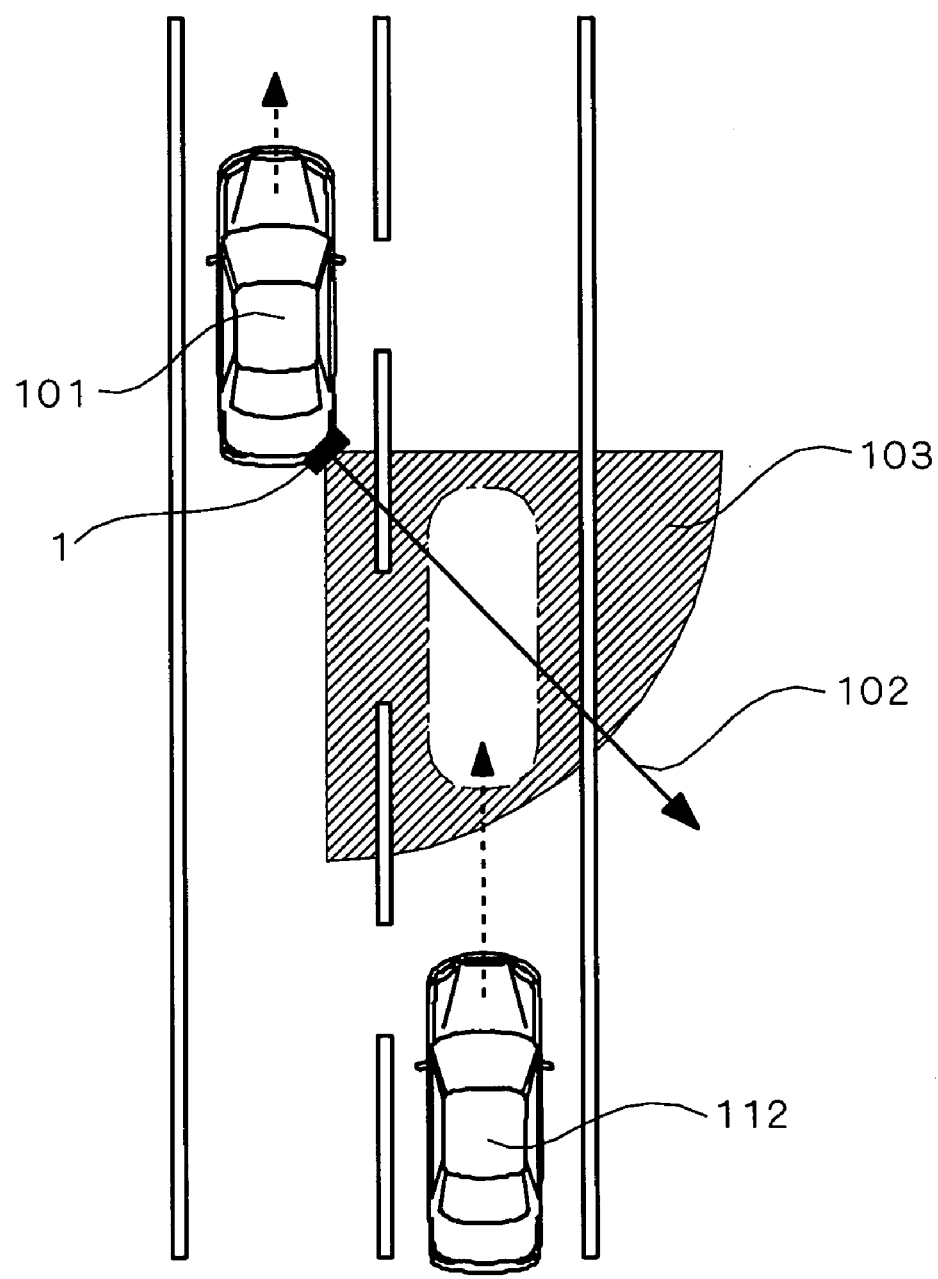
Figures 8A, 8B:
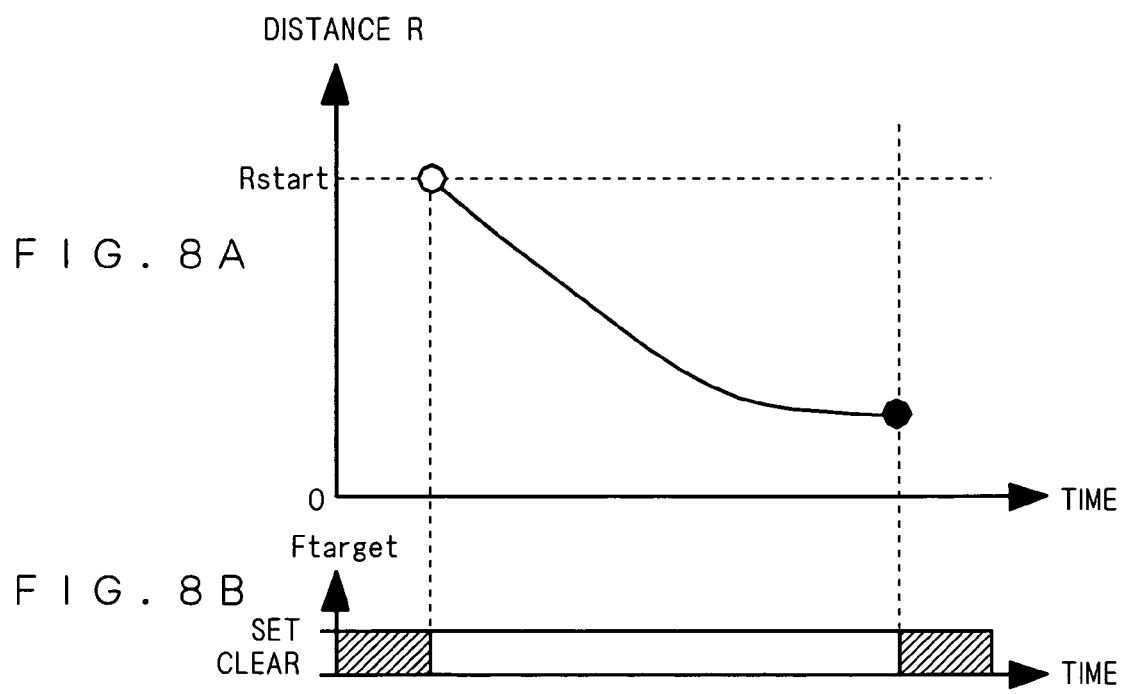

FIG. 7 shows a state where the host vehicle 101 and a rearwardly approaching vehicle 112 traveling in an adjacent lane on its right side pass each other. FIGS. 8A and 8B show a change with time in the distance R and the flag Ftarget in this case, respectively. A value indicated by a white circle in FIG. 8A indicates the distance R when the vehicle 112 has been detected for the first time by the sensor 1, and a value indicated by a black circle indicates the distance R in the distance measuring cycle immediately before the sensor 1 loses track of the vehicle 112.

When the vehicle 112 overtaking the host vehicle 101 is detected continuously, the distance R decreases with time, as shown in FIG. 8A. The reason for this is the vehicle 112 approaches the sensor 1 with time, and departs from the detection range 103 of the sensor 1 when it starts moving away from the sensor 1.

FIG. 9 shows a state where the host vehicle 101 and a forwardly approaching stationary object 113 pass each other. FIGS. 10A and 10B show a change with time in the distance R and the flag Ftarget in this case, respectively. A value indicated by a white circle in FIG. 10A indicates the distance R when the stationary object 113 has been detected for the first time by the sensor 1, and a value indicated by a black circle indicates the distance R in the distance measuring cycle immediately before the sensor 1 loses track of the stationary object 113. Time T2 in FIG. 10A indicates the time between the start of detection of and loss of track of the stationary object 113 by the sensor 1.

When the stationary object 113 passing the host vehicle 101 is detected continuously, the distance R increases with time, as shown in FIG. 10A. The reason for this, as in the case where the host vehicle 101 and the forwardly approaching vehicle 111 pass each other, is the sensor 1 starts detecting the stationary object 113 when it most approaches the sensor 1, and the stationary object 113 moves away from the sensor 1 with time.

Moreover, as shown in FIG. 10A, the time T2 is shorter than the time T1 shown in FIG. 6A. This is because the relative velocity between the host vehicle 101 and the stationary object 113 that is at rest is larger than that between the host vehicle 101 and the vehicle 111 that is traveling in the same direction as the host vehicle 101.

As discussed above, when objects approaching the host vehicle 101 from the front, such as the vehicle 111 and the stationary object 113, are detected using the sensor 1 for detecting an object in a slanting rear direction of the host vehicle 101, the distance R detected by the sensor 1 increases with time. Conversely, when the rearwardly approaching vehicle 112 is detected, the distance R decreases with time. Therefore, the determination whether an object detected by the sensor 1 is an alarming object based on a change with time in the distance R, as performed at steps s25 and s26, ensures that the vehicle 112 is regarded as an alarming object.

Besides, the time T2 before the sensor 1 loses track of the stationary object 113 is shorter than the time T1 before the sensor 1 loses track of the vehicle 111, so the stationary object 113 passes the host vehicle 101 faster than the vehicle 111 does. Therefore, the determination whether an object is an alarming object based on the detection duration Tdetect of the object, as performed at steps s28 to s30, ensures that the stationary object 113 is omitted from alarming object targets.

Here, time Tlost between the start of detection of and loss of track of the stationary object 113 by the sensor 1, like the time T2, may be expressed by the following equation (1):

$$Tlost = Dm/VS \quad (1)$$

The distance Dm in the above equation (1) indicates a distance which the stationary object 113 passes through in the detection range 103 of the sensor 1. As indicated in the equation (1), the time Tlost before the sensor 1 loses track of the stationary object 113 depends on the speed VS of the host vehicle 101. Therefore, at the above step s27 in the first preferred embodiment, the threshold time Tth is set using the following equation (2):

$$Tth = Dr/VS \quad (2)$$

The distance Dr in the above equation (2) indicates the longest distance in the Y1-axis direction in the detection range 103 of the sensor 1, i.e. the radius of the sector-shaped detection range 103, which is previously stored in the alarming object determination part 4. For example, in the present example where the radius of the detection range 103 is set to 5 m, when the host vehicle 101 is traveling with a speed of 50 km per hour, the threshold time Tth becomes 360 ms. Since the distance Dm which the stationary object 113 passes through in the detection range 103 of the sensor 1 is usually less than the distance Dr, the time Tlost becomes less than the threshold time Tth.

In view of the fact that the passage time of the stationary object 113 through the detection range 103 of the sensor 1 depends on the speed VS of the host vehicle 101, the threshold time Tth is set based on the speed VS of the host vehicle 101, and the flag Ftarget is cleared with the detection duration Tdetect being less than the threshold time Tth and set with Tdetect exceeding Tth, to ensure that the stationary object 113 is omitted from alarming object targets.

Additionally, when the host vehicle 101 and a vehicle on the opposite lane pass each other, the time between the start of detection of and loss of track of the oncoming vehicle by the sensor 1 is shorter than the time T2 between the start of detection of and loss of track of the stationary object 113. Therefore, the alarm device according to the first preferred embodiment also ensures that the stationary object 113 as well as a vehicle on the opposite lane are omitted from alarming object targets.

Figure 12:
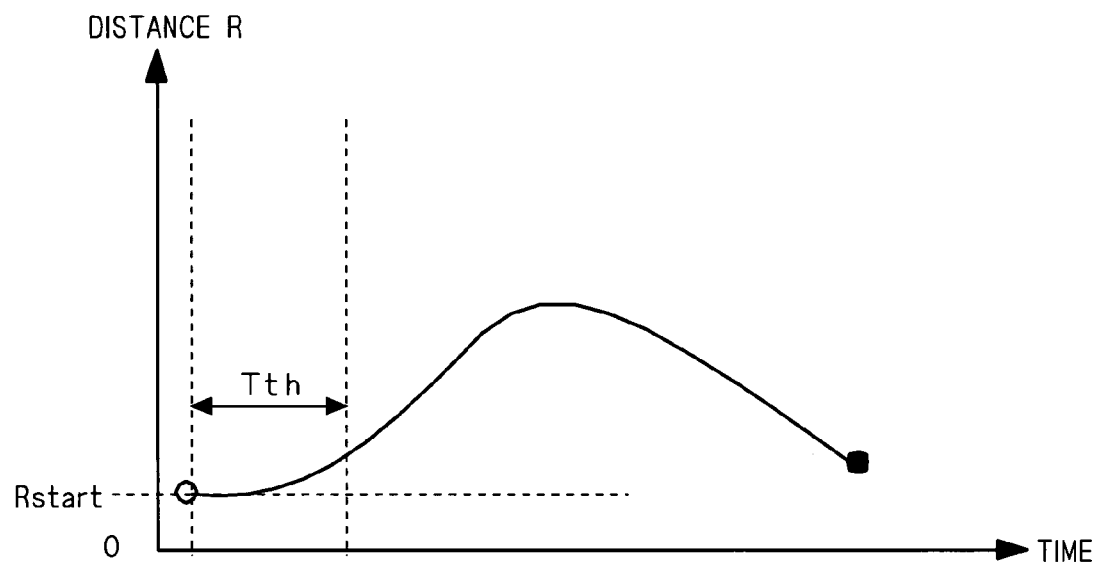
Figure 13:
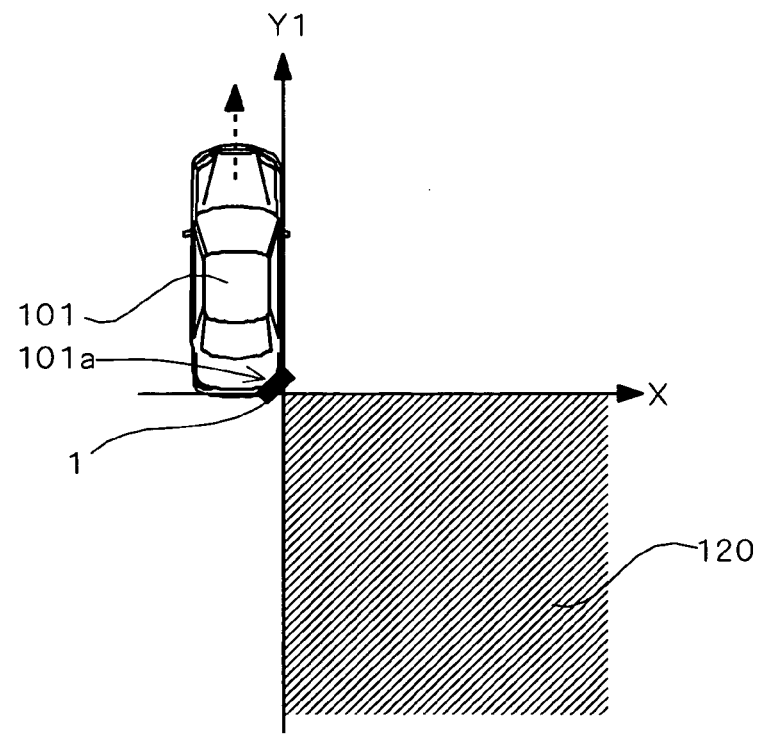
FIG. 13 shows a set region of a detection range of a distance measuring sensor according to the first preferred embodiment.

Moreover, the alarm device according to the first preferred embodiment, which regards a certain object as an alarming object when the detection duration Tdetect thereof becomes more than the threshold time Tth, can regard the forwardly approaching vehicle 111 remaining in a blind spot of the driver of the host vehicle 101 as an alarming object. FIGS. 11A to 11C show a state where the vehicle 111 passes and then approaches the host vehicle 101 again to remain in the driver's blind spot, and FIG. 12 shows a change with time in the distance R in this case. FIG. 11A shows a state before the vehicle 111 and the host vehicle 101 pass each other, FIG. 11B immediately after they pass each other, and FIG. 11C where the vehicle 111 remains in the blind spot.

As shown in FIGS. 11A to 11C, even after the host vehicle 101 and the vehicle 111 pass each other, the vehicle 111 may approach the host vehicle 101 afterward to remain in a blind spot of the driver of the host vehicle 101. The alarm device according to the first preferred embodiment, which regards a certain object as an alarming object when the detection duration Tdetect thereof exceeds the threshold time Tth, can regard the rearwardly approaching vehicle 112 as well as the forwardly approaching vehicle 111 remaining in the driver's blind spot as an alarming object.

While the sensor 1 has the maximum radiation direction 102 set toward a rightward-slanting rear direction of the host vehicle 101 at an angle of 45 degrees and has the viewing angle α set to 90 degrees in the alarm device according to the first preferred embodiment, the direction 102 and the viewing angle a can be set arbitrarily so long as they remain in a region 120 extending from the rear to the right side of the corner portion 101a of the host vehicle 101.

Further, while the sensor 1 is mounted only at the right rearward corner portion 101a in the first preferred embodiment, it may also be provided at a left rearward corner potion as required, to detect an object in a leftward-slanting rear direction of the host vehicle 101. In this case, an appropriate alarm can be generated to the driver when he or she makes a lane change to the left lane.

Second Preferred Embodiment

Figure 14:
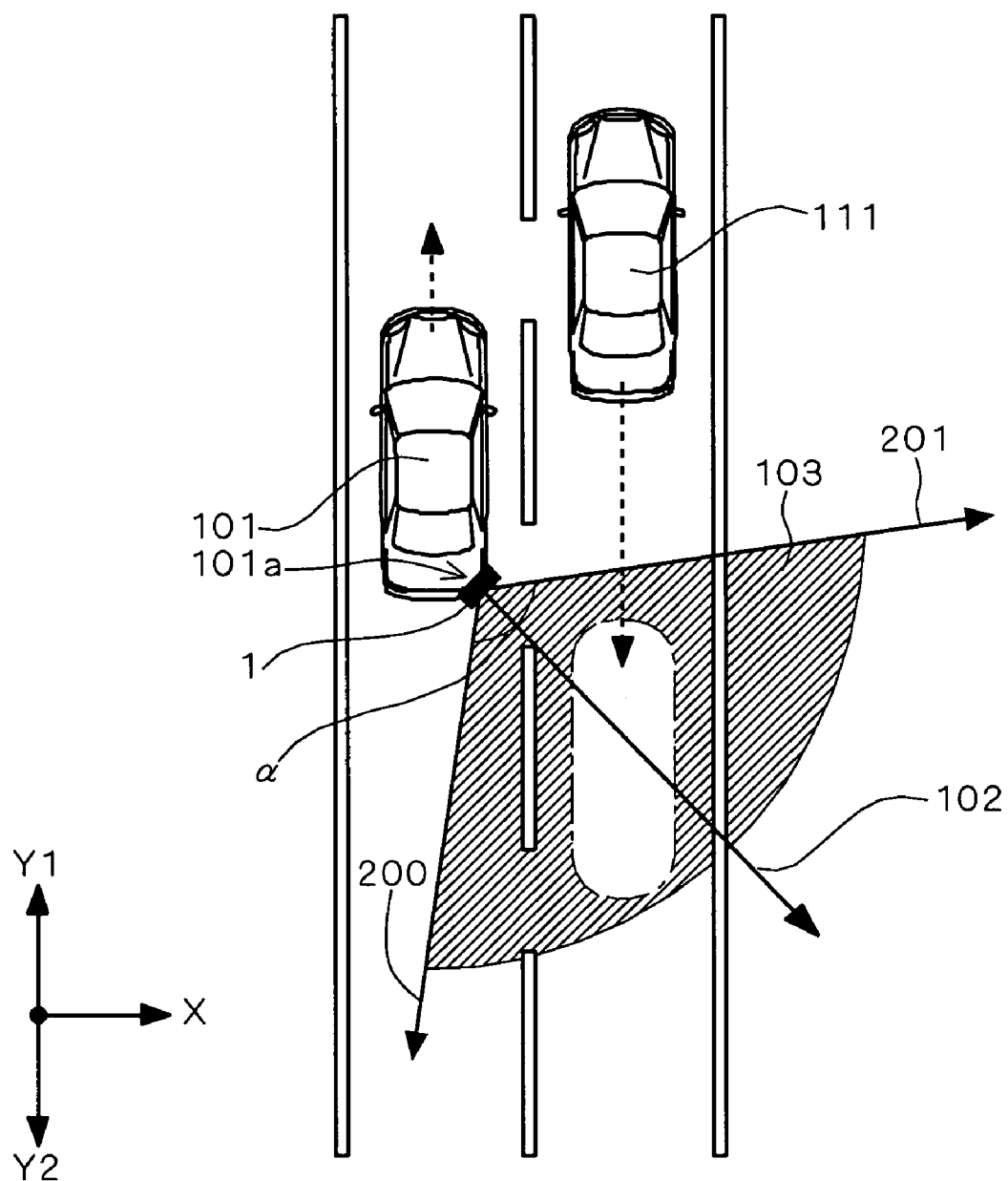
FIG. 14 shows a detection range of a distance measuring sensor according to a second preferred embodiment of the present invention.

FIG. 14 shows the detection range 103 of the sensor 1 in an alarm device according to a second preferred embodiment of the present invention. This alarm device is a modification of that of the first preferred embodiment, which modifies the detection range 103 of the sensor 1 and the alarming object determination process.

The viewing angle α of the sensor 1 in the second preferred embodiment is set larger than 90 degrees of the first preferred embodiment, to 120 degrees for example, as shown in FIG. 14. And as with the first preferred embodiment, the maximum radiation direction 102 of the receiving and transmitting antennas (neither is shown) of the sensor 1 is set toward a rightward-slanting rear direction of the host vehicle 101 at an angle of 45 degrees. Accordingly, the detection range 103 in the second preferred embodiment has the shape of a sector with the corner portion 101a as its center and a central angle of 120 degrees, extending from a direction 200 obtained by rotating the direction extending from the corner portion 101a of the host vehicle 101 in the Y2-axis direction by 30 degrees clockwise in top view of the host vehicle 101 to a direction 201 obtained by rotating the direction extending from the corner portion 101a in the X-axis direction by 30 degrees counterclockwise in top view of the host vehicle 101.

When an object approaching the host vehicle 101 is detected using the sensor 1 having such detection range 103 that covers ahead of the position where the sensor 1 is mounted in the host vehicle 101, i.e. the corner portion 101a in this example, the distance R changes with time in a different manner from the first preferred embodiment. The alarm device according to the second preferred embodiment is suitable for using the sensor 1 having the detection range 103 such as is shown in FIG. 14. The operation of the alarm device according to the second preferred embodiment will be explained below in detail.

Figure 15:
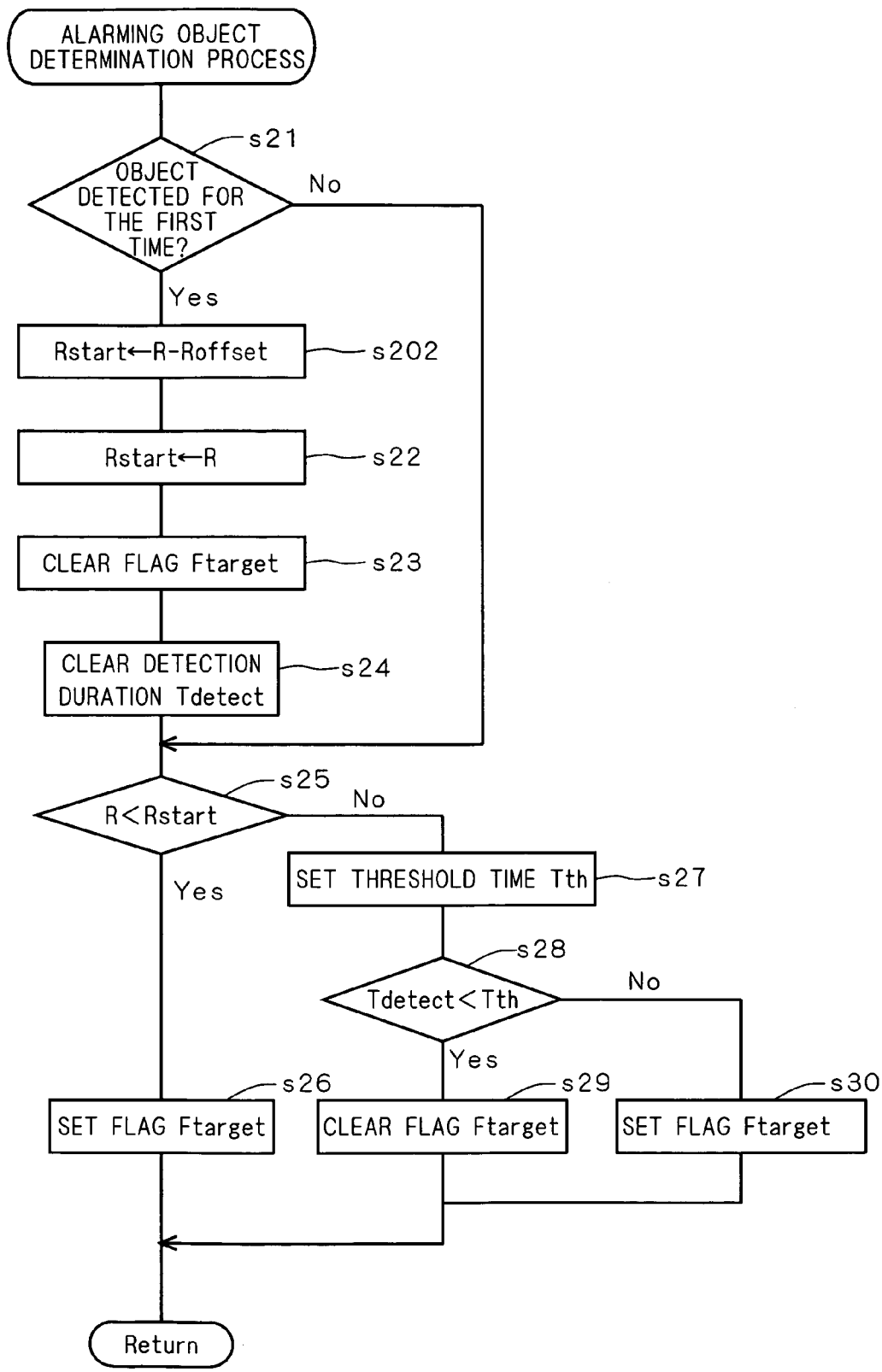
FIG. 15 is a flowchart illustrating the operation of an alarm device for a vehicle according to the second preferred embodiment.

FIG. 15 is a flowchart illustrating the alarming object determination process according to the second preferred embodiment. This determination process is a modification of that of the first preferred embodiment, which performs step s202 instead of step s22. As shown in FIG. 15, it is first determined at step s21 whether an object detected at step s1 has been detected for the first time by the sensor 1. After it has been determined as much at step s21, at step s202, the alarming object determination part 4 stores a value that subtracts a previously stored prescribed offset distance Roffset from the distance R indicated by the distance information RI received at step s1, as the alarming object determination distance Rstart. Consequently, a value that subtracts a prescribed distance from the distance R to the object detected at step s1 at the moment of starting detection by the sensor 1 is stored as Rstart. Then, steps s23 and s24 are performed in order, clearing the flag Ftarget and the detection duration Tdetect.

After step s24 has been performed, or when it is determined at step s21 that the detected object has not been detected for the first time by the sensor 1, the alarming object determination part 4 compares the distance R indicated by the distance information RI received at step s1 and the alarming object determination distance Rstart at step s25. Then, when the comparison result at step s25 shows the distance R is less than Rstart, the flag Ftarget is set at step s26.

On the other hand, when the comparison result at step s25 shows the distance R is not less than Rstart, the threshold time Tth is set at step s27. Then, the current detection duration Tdetect and the threshold time Tth are compared at step s28.

Alternatively, in the alarm device according to the second preferred embodiment, step s26 may be performed when the distance R is not more than the alarming object determination distance Rstart at step s25, or step s27 may be performed when the distance R is more than Rstart. In such ways, either of step s26 and s27 may be performed when the values of the distance R and Rstart are equal to each other.

When the comparison result at step s28 shows the detection duration Tdetect is less than the threshold time Tth, the flag Ftarget is cleared at step s29. On the other hand, when the comparison result shows Tdetect is not less than Tth, the flag Ftarget is set at step s30.

Following any of steps s26, s29 and s30, the alarm determination process and the output process similar to those in the first preferred embodiment are performed in order, completing one distance measuring cycle. Subsequently, step s1 is performed to start the next distance measuring cycle that repeats the similar processes. Consequently, when the distance R to a certain object that has been detected continuously becomes less than the value that subtracts the offset distance Roffset from the distance R at the moment of starting detection of the object, it is determined that the object is an alarming object. When the distance R is more than the value that subtracts the offset distance Roffset from the distance R at the moment of starting detection of the object, then when the detection duration Tdetect is less than the threshold time Tth, it is determined that the object is not an alarming object, and when Tdetect becomes more than Tth, it is determined that the object is an alarming object. And after it has been determined that the object detected by the sensor 1 is an alarming object, when the object is approaching the vehicle to the extent that it is likely to collide with the vehicle with the driver indicating his or her intention to make a lane change to the right lane, an alarm is generated to the driver.

As discussed above, unlike the first preferred embodiment, the alarm device according to the second preferred embodiment adopts the value that subtracts the offset distance Roffset from the distance R to a certain object at the moment of starting detection of the object, as Rstart. Consequently, the alarm device ensures that an alarm is prevented from being generated for a forwardly approaching stationary object and a vehicle on the opposite lane, even with the detection range 103 of the sensor 1 such as is shown in FIG. 14. This will be explained below in detail.

Figure 16:
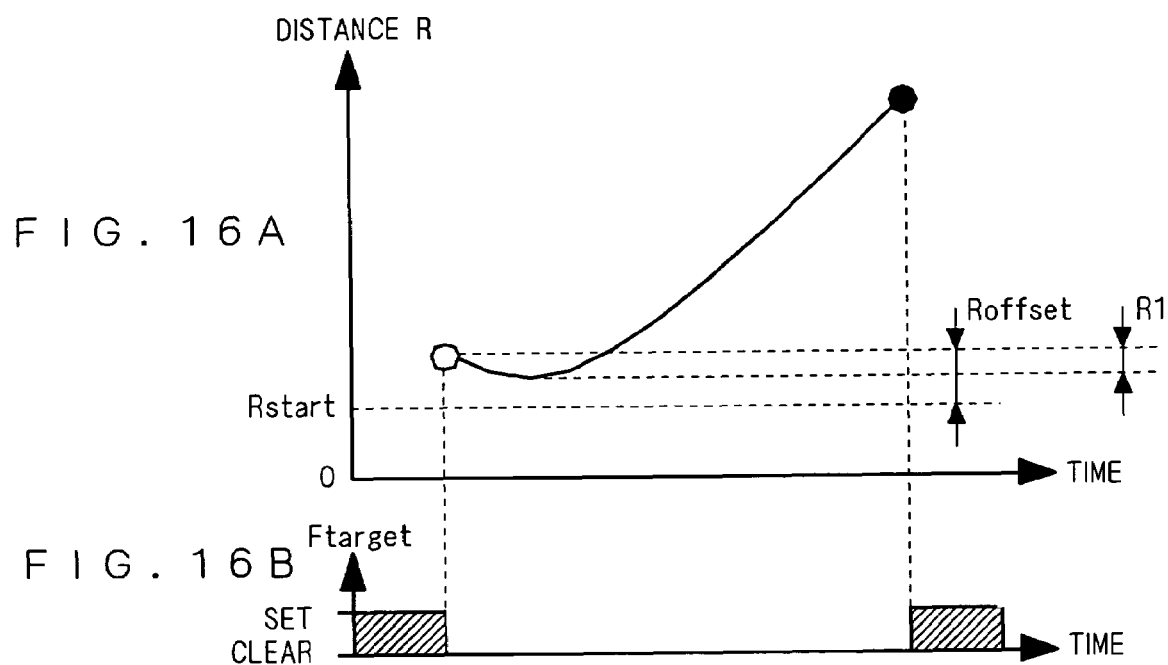
FIGS. 16A, 16B, 17, 18A, 18B, 19, 20A and 20B explain the operation of the alarm device for a vehicle according to the second preferred embodiment.
Figure 17:
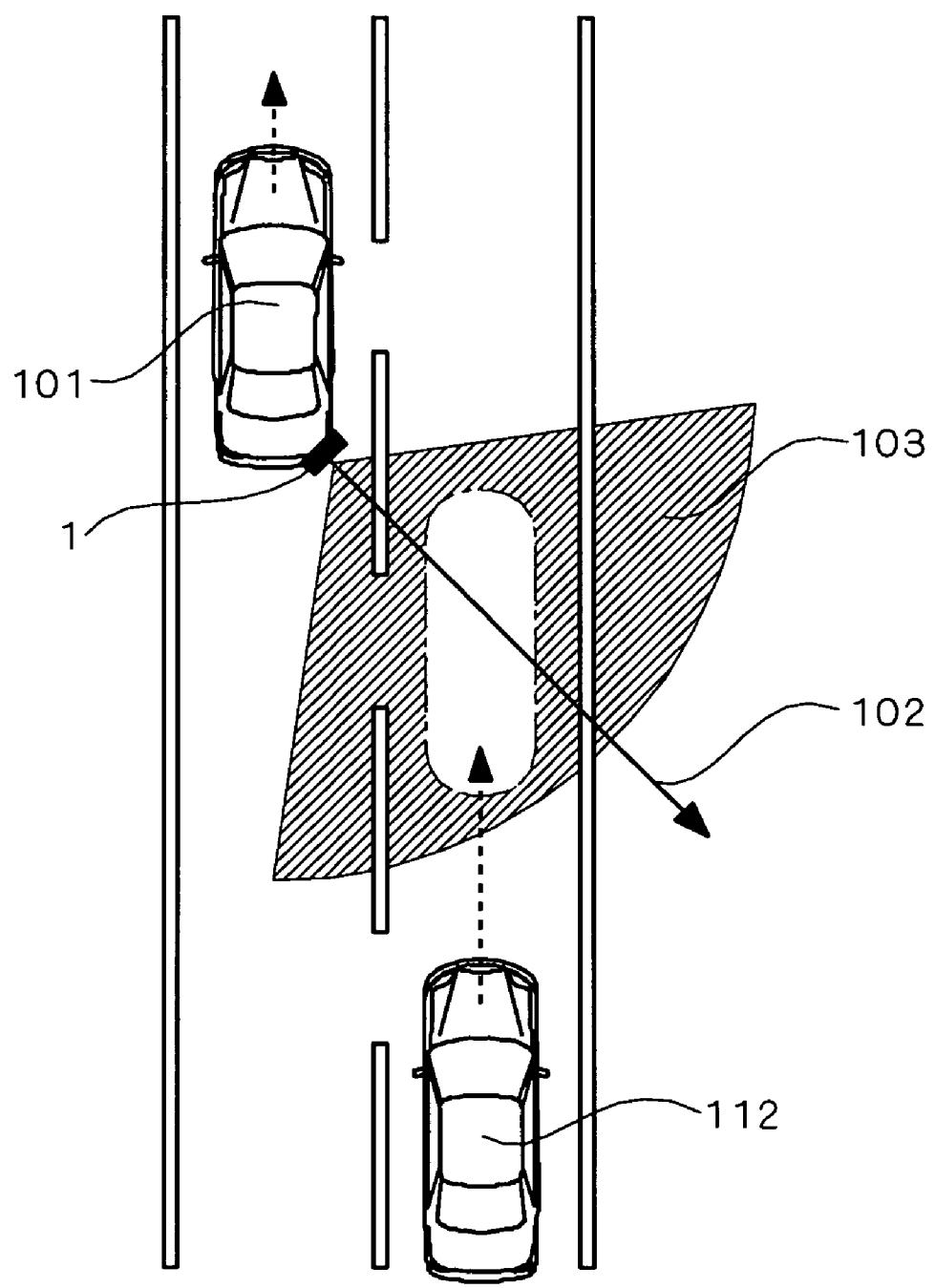
Figure 18:
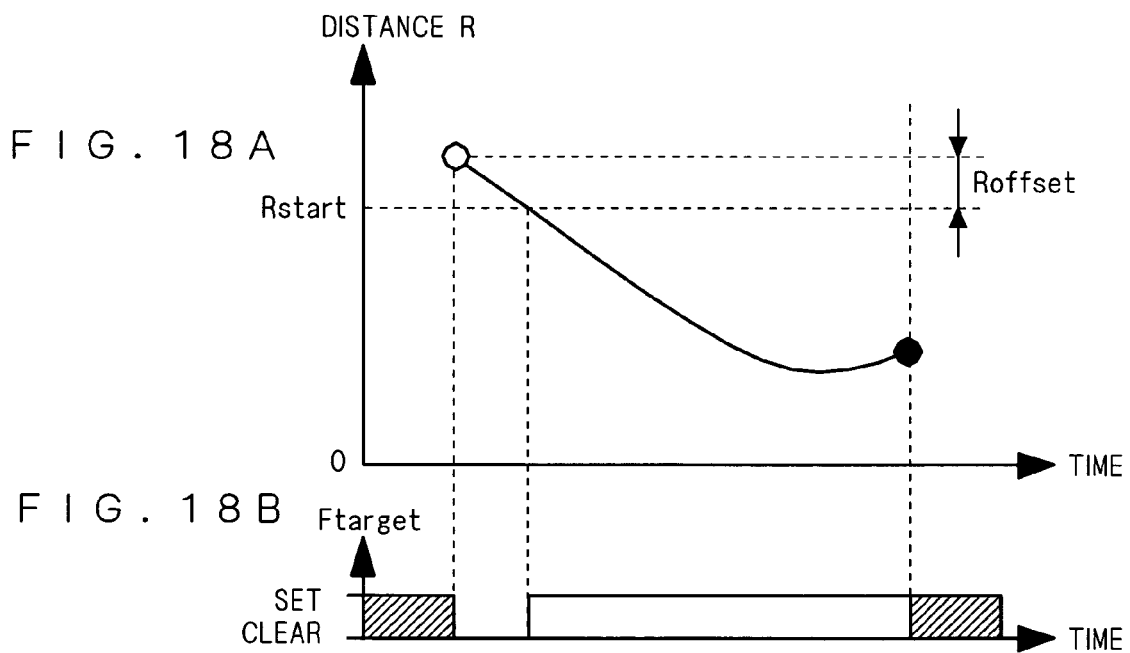
Figure 19:
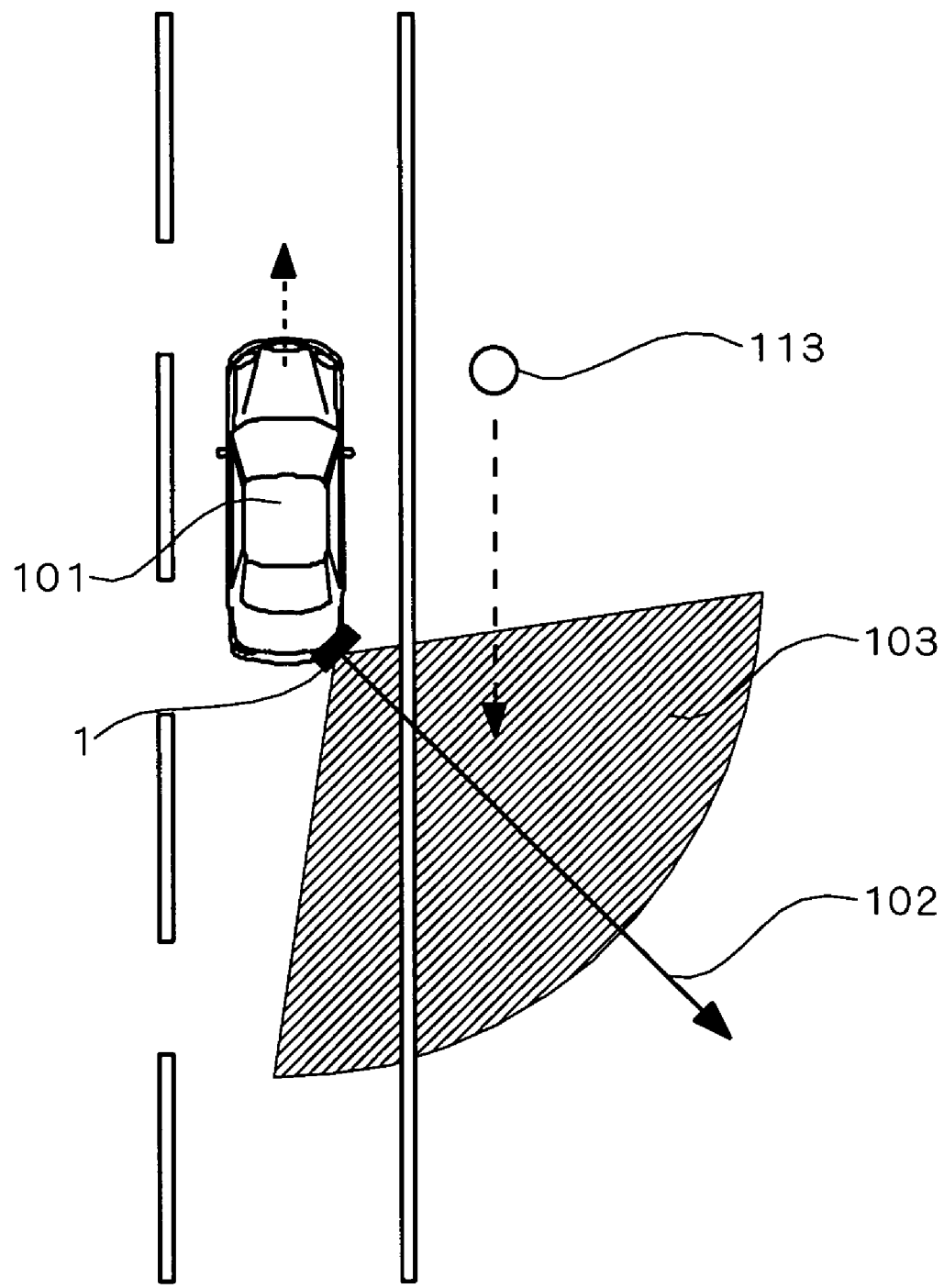

FIGS. 16A and 16B show a change with time in the distance R and the flag Ftarget, respectively, when the host vehicle 101 on which the alarm device according to the second preferred embodiment is mounted and the forwardly approaching vehicle 111 pass each other. FIG. 17 shows a state where the host vehicle 101 according to the second preferred embodiment and the rearwardly approaching vehicle 112 pass each other, and FIGS. 18A and 18B show a change with time in the distance R and the flag Ftarget in this case, respectively. FIG. 19 shows a state where the host vehicle 101 according to the second preferred embodiment and the forwardly approaching stationary object 113 pass each other, and FIGS. 20A and 20B show a change with time in the distance R and the flag Ftarget in this case, respectively.

Figure 20:
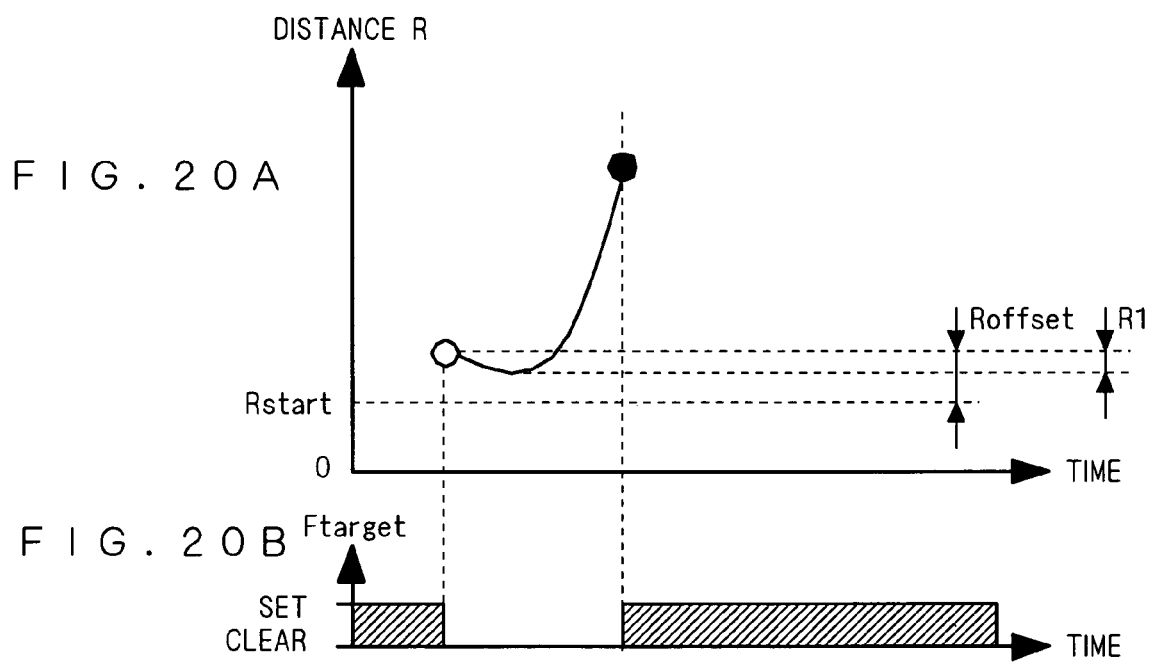

Values indicated by a white circle in FIGS. 16A, 18A and 20A indicate the distance R when the vehicle 111, vehicle 112 and stationary object 113 have been detected for the first time by the sensor 1, respectively, and values indicated by a black circle indicate the distance R in the distance measuring cycle immediately before the sensor 1 loses track of the vehicle 111, vehicle 112 and stationary object 113, respectively.

As shown in FIGS. 16A and 20A, when the sensor 1 has the detection range 103 larger than that in the first preferred embodiment, as is shown in FIG. 14, the distance R increases with time after temporarily dropping below a value (hereinafter referred to as an "initial value") at the moment of starting detection of the stationary object 113 or the vehicle 111 by the sensor 1. Accordingly, the distance R takes on a value less than its initial value for a period of time immediately after the start of detection of the stationary object 113 or the vehicle 111 .

The reason for this is, as the detection range 103 of the sensor 1 according to the second preferred embodiment covers ahead of the position where the sensor 1 is mounted in the host vehicle 101, the distance between the sensor 1 and the stationary object 113, etc. reaches its minimum value after the passage of a period of time after the start of detection of the stationary object 113, etc. by the sensor 1. For this reason, the setting of the alarming object determination distance Rstart as the initial value of the distance R as in the first preferred embodiment would lead to an erroneous determination at step s25 that an object that is actually the forwardly approaching stationary object 113 or forwardly approaching vehicle 111 is the rearwardly approaching vehicle 112, thus possibly generating an alarm for the stationary object 113 for which an alarm does not need to be generated. Hereinafter, a difference between the initial value of the distance R and the distance R when the sensor 1 most approaches the vehicle 111 or the stationary object 113 is referred to as a "distance RI".

As discussed above, the second preferred embodiment adopts, as the alarming object determination distance Rstart, the value that subtracts the offset distance Roffset from the initial value of the distance R. Consequently, a proper adjustment to Roffset prevents the distance R when the stationary object 113, etc. and the host vehicle 101 pass each other from dropping below Rstart, ensuring that an alarm is prevented from being generated for the stationary object 113.

Figure 21:
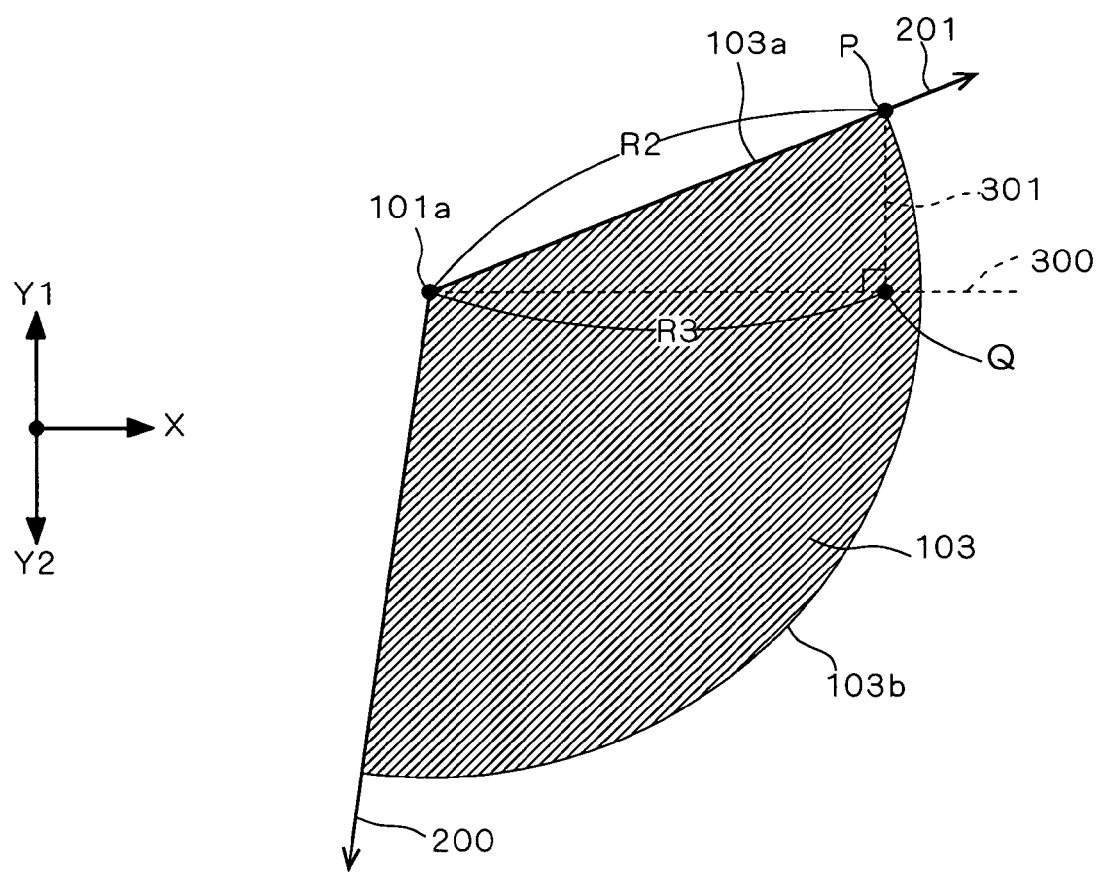
FIG. 21 shows a detection range of the distance measuring sensor according to the second preferred embodiment.

For example, the offset distance Roffset is set to a value that subtracts a distance R3 from a distance R2 shown in FIG. 21. The distance R2 is the radius of the sector-shaped detection range 103, and the distance R3 is a distance between the corner portion 101a of the host vehicle 101 and a point Q, the point Q being an intersection point of a virtual perpendicular 301 being dropped from an intersection point P of a side 103a extending along the direction 201 and an arc 103b in the detection range 103 to a virtual line 300 extending in the X-axis direction from the corner portion 101a of the host vehicle 101 and the virtual line 300.

Such proper setting of the offset distance Roffset usually allows the distance RI when the host vehicle 101 and the vehicle 111, etc. pass each other to be less than the offset distance Roffset. Therefore, even when the detection range 103 of the sensor 1 covers ahead of the position where the sensor 1 is mounted in the host vehicle 101 and thus the distance R detected by the sensor 1 temporarily decreases immediately after the start of detection of the stationary object 113, etc., as in the second preferred embodiment, erroneous recognition can be prevented at step s25 that an object that is actually the forwardly approaching stationary object 113, etc. is the rearwardly approaching vehicle 112, ensuring that an alarm is prevented from being generated for the stationary object 113.

Besides, as shown in FIG. 18B, the flag Ftarget when the host vehicle 101 and the vehicle 112 pass each other enters a clear state for a period of time after the vehicle 112 has been detected for the first time by the sensor 1. The flag Ftarget is set afterward when the distance R becomes less than the alarming object determination distance Rstart, whereby the vehicle 112 is regarded as an alarming object.

As in the case of the stationary object 113, the alarm device according to the second preferred embodiment ensures that an alarm is prevented from being generated for a vehicle on the opposite lane.

Alternatively, the alarming object determination process according to the second preferred embodiment may be adopted into an alarm device including the sensor 1 according to the first preferred embodiment or the sensor 1 having the viewing angle α of less than 90 degrees. This ensures that, even when noise is superimposed on the value of the distance R detected by the sensor 1, an alarm is prevented from being generated for the stationary object 113, a vehicle on the opposite lane, etc.

Figure 22:
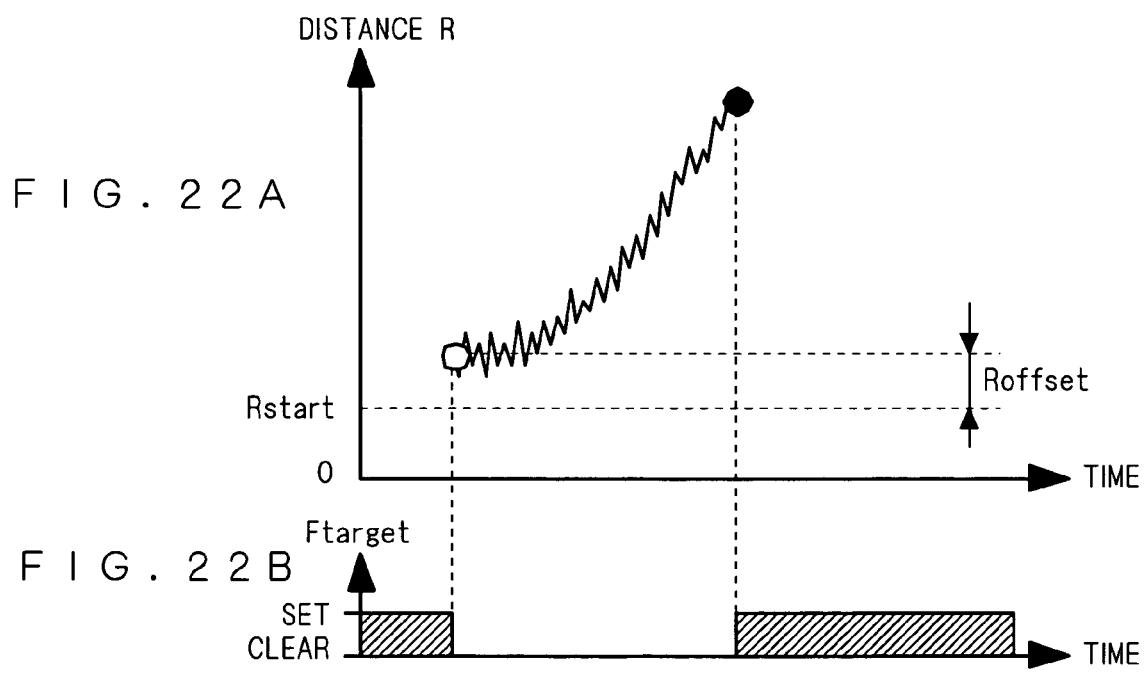
FIGS. 22A and 22B explain the operation of the alarm device for a vehicle according to the first preferred embodiment.

FIGS. 22A and 22B show a state where noise is superimposed on the value of the distance R detected by the sensor 1 according to the first preferred embodiment and the state of the flag Ftarget in that case, respectively. Like FIGS. 10A and 10B discussed above, FIG. 22A shows a change with time in the distance R when the host vehicle 101 and the stationary object 113 pass each other, and FIG. 22B shows the state of the flag Ftarget in that case. A value indicated by a white circle in FIG. 22A indicates the distance R when the stationary object 113 has been detected for the first time by the sensor 1, and a value indicated by a black circle indicates the distance R in the distance measuring cycle immediately before the sensor 1 loses track of the stationary object 113.

As shown in FIG. 22A, noise is sometimes superimposed on the value of the distance R output from the sensor 1 due to mechanical vibrations of the host vehicle 101 and the like. And in that case, the distance R may take on a value less than its initial value, as in the case where the detection range 103 has a shape such as is shown in FIG. 14. For this reason, the setting of the alarming object determination distance Rstart as the initial value of the distance R in this case may cause an alarm to be erroneously generated for the stationary object 113. Therefore, the adoption of the value that subtracts the offset distance Roffset from the initial value of the distance R as Rstart even for the sensor 1 having the viewing angle α of not more than 90 degrees will ensure that an alarm is prevented from being generated for the stationary object 113 even when noise is superimposed on the value of the distance R.

Figure 23:
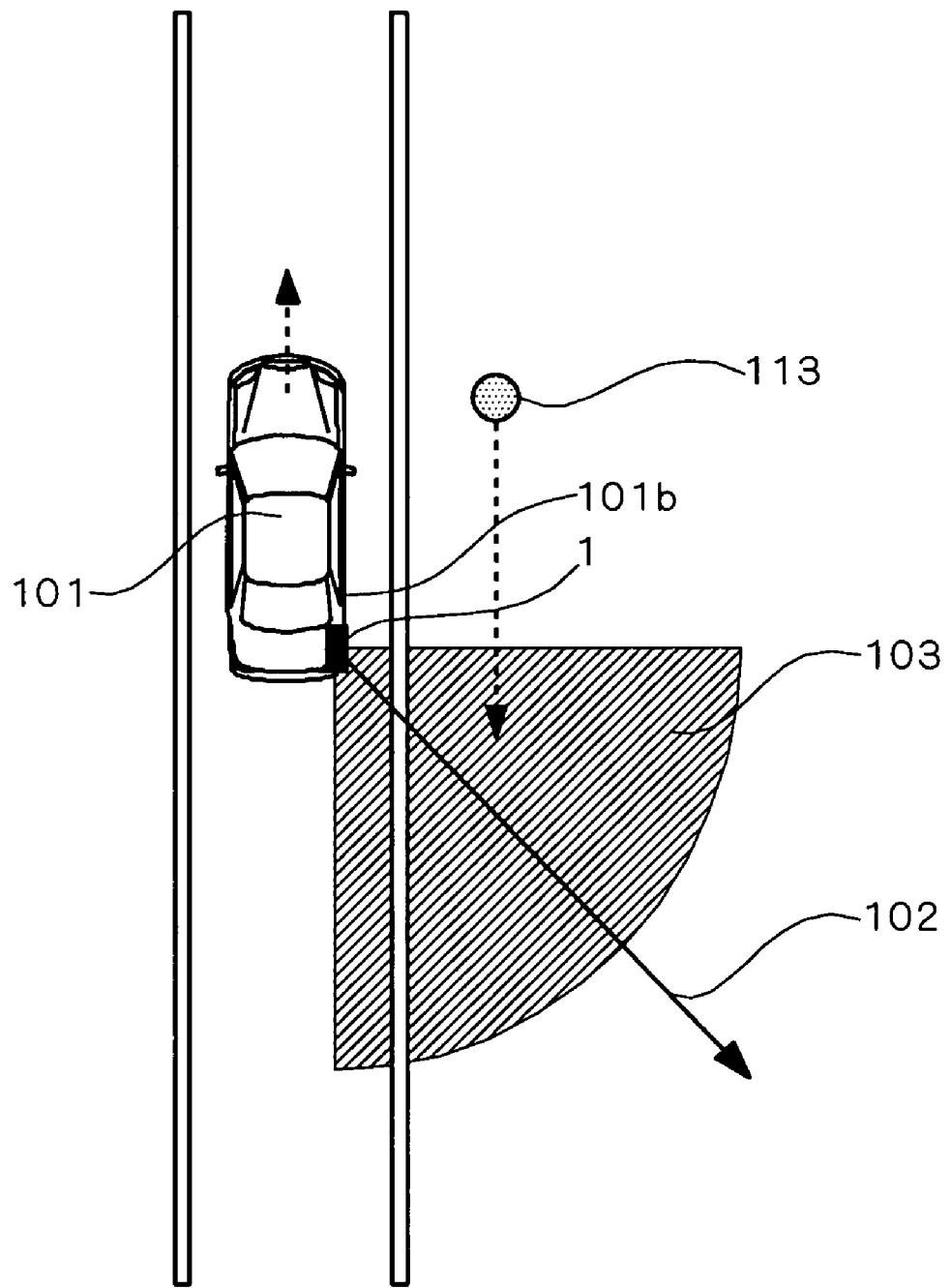

Additionally, while the sensor 1 is mounted at the right rearward corner portion 101a of the host vehicle 101 in the first and second preferred embodiments, it may be mounted at the rear of a right surface 101b of the host vehicle 101 as shown in FIG. 23, or at the right of a rear surface 101c as shown in FIG. 24. In those cases, the maximum radiation direction 102 of the transmitting and receiving antennas of the sensor 1 should be adjusted such that the detection range 103 where the radiation patterns of the transmitting and receiving antennas overlap one another is set to have the same shape as those in the first and second preferred embodiment, thereby obtaining the similar effects as those in the first and second preferred embodiments. The detection ranges 103 shown in FIGS. 23 and 24 are both set to have the same shape as that in the first preferred embodiment.

The provision of the sensor 1 on the right surface 101b or rear surface 101c of the host vehicle 101 as discussed above ensures that, even when it is difficult to mount the sensor 1 at the corner portion 101a, the stationary object 113 and a vehicle on the opposite lane are omitted from alarming object targets while regarding the vehicle 112 as well as a vehicle remaining in the driver's blind spot as an alarming object.

When the sensor 1 is mounted on the right surface 101b or rear surface 101c of the host vehicle 101, its detection range 103 is easily set to have the same shape as those in the first and second preferred embodiments by setting of the maximum radiation direction 102 of one or both of the transmitting and receiving antennas of the sensor 1 toward a rightward-slanting rear direction of the host vehicle 101.

While the invention has been shown and described in detail, the foregoing description is in all aspects illustrative and not restrictive. It is therefore understood that numerous modifications and variations can be devised without departing from the scope of the invention.

What is claimed is:

1. An alarm device for a vehicle, comprising:
   a distance measuring sensor for detecting a distance between an object in a slanting rear direction of a vehicle and said vehicle;
   a lane changing detection part for detecting said vehicle's driver's indication of his or her intention to make a lane change;
   an alarm object determination part for determining whether an object detected by said distance measuring sensor is an alarm object; and
   an alarm generation part for generating an alarm to said driver based on said distance detected by said distance measuring sensor, a determination result by said alarm object determination part, and a detection result by said lane changing detection part, wherein
   said alarm object determination part determines whether a certain object is an alarm object based on a chance with time in said distance to said certain object that has been detected continuously by said distance measuring sensor, and detection duration of said certain object by said distance measuring sensor.

2. The alarm device for a vehicle according to claim 1 wherein
   when said distance to a certain object that has been detected continuously by said distance measuring sensor becomes less than said distance at the moment of starting detection of said certain object by said distance measuring sensor, said alarm object determination part determines that said certain object is an alarm object, and
   when said distance to said certain object that has been detected continuously is not less than said distance at the moment of starting detection of said certain object, said alarm object determination part determines that said certain object is not an alarm object when said detection duration is less than a threshold time, and determines that said certain object is an alarm object when said detection duration becomes more than said threshold time.

3. The alarm device for a vehicle according to claim 1, wherein
   when said distance to a certain object that has been detected continuously by said distance measuring sensor becomes less than a value that subtracts a prescribed distance from said distance at the moment of starting detection of said certain object by said distance measuring sensor, said alarm object determination part determines that said certain object is an alarm object, and
   when said distance to said certain object that has been detected continuously is more than a value that subtracts a prescribed distance from said distance at the moment of starting detection of said certain object, said alarm object determination part determines that said certain object is not an alarm object when said detection duration is less than a threshold time, and determines that said certain object is an alarm object when said detection duration becomes more than said threshold time.

4. The alarm device for a vehicle according to claim 2, further comprising a speed sensor for detecting a speed of said vehicle, wherein
   said alarm object determination part sets said threshold time based on a speed of said vehicle, detected by said speed sensor.

5. The alarm device for a vehicle according to claim 3, further comprising a speed sensor for detecting a speed of said vehicle, wherein
   said alarm object determination part sets said threshold time based on a speed of said vehicle detected by said speed sensor.

6. The alarm device for a vehicle according to claim 1, wherein said distance measuring sensor is provided at a corner portion of said vehicle.

7. The alarm device for a vehicle according to claim 1, wherein said distance measuring sensor is provided on a side surface of said vehicle.

8. The alarm device for a vehicle according to claim 1, wherein said distance measuring sensor is provided on a rear surface of said vehicle.

9. The alarm device for a vehicle according to claim 1,
   wherein when said distance to a certain object that has been detected continuously by said distance measuring sensor becomes less than said distance at the moment of starting detection of said certain object by said distance measuring sensor, said alarm object determination part determines that said certain object is an alarm object.

* * * * *